(12) United States Patent
Lee et al.

(10) Patent No.: US 12,210,406 B2
(45) Date of Patent: Jan. 28, 2025

(54) STORAGE DEVICE AND OPERATING METHOD THEREOF INCLUDING STORING LOG DATA

(71) Applicant: Samsung Electronics Co., Ltd., Suwon-si (KR)

(72) Inventors: Kyungduk Lee, Seongnam-si (KR); Youngseop Shim, Seoul (KR); Jongsung Na, Hwaseong-si (KR); Inhwan Doh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 255 days.

(21) Appl. No.: 17/718,523

(22) Filed: Apr. 12, 2022

(65) Prior Publication Data

US 2023/0069623 A1   Mar. 2, 2023

(30) Foreign Application Priority Data

Sep. 1, 2021   (KR) .................. 10-2021-0116505

(51) Int. Cl.
*G06F 11/00* (2006.01)
*G06F 11/07* (2006.01)
*G06F 3/06* (2006.01)

(52) U.S. Cl.
CPC ........ *G06F 11/0778* (2013.01); *G06F 3/0604* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 9,941,007 | B2 | 4/2018 | Peddle et al. |
| 9,946,592 | B2* | 4/2018 | Rasor ................. G06F 11/0727 |
| 10,942,800 | B2 | 3/2021 | Yun et al. |
| 11,010,233 | B1 | 5/2021 | Golden et al. |
| 11,132,133 | B2 | 9/2021 | Dedrick |
| 2012/0260138 | A1 | 10/2012 | Downing, III et al. |
| 2017/0132067 | A1 | 5/2017 | Vanaja et al. |
| 2019/0114218 | A1* | 4/2019 | Yun .................... G06F 11/0784 |
| 2019/0155682 | A1 | 5/2019 | Sinha et al. |
| 2020/0241989 | A1 | 7/2020 | Mun et al. |
| 2020/0249850 | A1 | 8/2020 | Klein et al. |

(Continued)

FOREIGN PATENT DOCUMENTS

| JP | 2019-169141 A | 10/2019 |
| KR | 10-2019-0041331 A | 4/2019 |

OTHER PUBLICATIONS

Google Scholar/Patents search—text refined (Year: 2024).*

(Continued)

*Primary Examiner* — Christopher S McCarthy
(74) *Attorney, Agent, or Firm* — Muir Patent Law, PLLC

(57) ABSTRACT

A storage device and operating method thereof includes a storage controller configured to receive a get log page command from a host and transmit, to the host, log data about at least one context selected from among respective contexts of a plurality of components according to the get log page command, and a memory storing the log data, wherein the get log page command includes selection information for selecting at least one component from among the plurality of components.

14 Claims, 15 Drawing Sheets

(56) References Cited

U.S. PATENT DOCUMENTS

2021/0182166 A1    6/2021  Hahn et al.
2021/0191837 A1*   6/2021  Gandhewar ......... G06F 11/0769
2021/0271540 A1*   9/2021  Sinnan Muthusamy ....................
                                                G06F 11/079

OTHER PUBLICATIONS

NVMe Specification 1.3, May 1, 2017.
NVMe Specification 1.4, Jun. 10, 2019.
Extended European Search Report (EESR) issued Oct. 7, 2022 for corresponding EP Patent Application No. 22171514.7.

* cited by examiner

FIG. 5

| Variable (NAND) | Value |
|---|---|
| Read Error Rate | a |
| Write Error Rate | b |
| Unrecoverable Write Errors | c |
| Read Recovery Attempts | d |
| ⋮ | ⋮ |

FIG. 6

```
{                                           PLD1
    "NAND"{
        "Read Error Rate"         :  0,
        "Write Error Rate"        :  0,
        "Unrecoverable Write Errors" : 0,
        "Read Recovery Attempts"  :  10,
                    ⋮
    }

PLD2
    "Performance"{
        "Throughput Performance"  :  0,
        "Perf Indicator"          :  1,
                    ⋮
    }

PLD3
    "Endurance"{
        "Timed Workload Media"    :  16,
        "Lifetime NAND Writes"    :  2808,
        "Lifetime Wear level Cnt" :  617,
                    ⋮
    }

PLD4
    "Thermal"{
        "Highest Temperature"     :  132,
        "Lowest Temperature"      :  130,
        "Current Temperature"     :  131,
                    ⋮
    }
}
```

STORAGE DEVICE AND OPERATING METHOD THEREOF INCLUDING STORING LOG DATA

CROSS-REFERENCE TO RELATED APPLICATION

This application is based on and claims priority under 35 U.S.C. § 119 to Korean Patent Application No. 10-2021-0116505, filed on Sep. 1, 2021, in the Korean Intellectual Property Office, the disclosure of which is incorporated by reference herein in its entirety.

BACKGROUND

The inventive concept relates to an electronic device, and more particularly, to a storage device and an operating method thereof.

A solid state drive (SSD) is an example of a flash memory-based mass storage device. The uses of SSDs have diversified with the explosive increase in demand for SSDs. An SSD should be managed and maintained to provide high reliability and optimal service quality.

During the operation of an SSD, an unexpected failure or error may occur due to a hardware or software problem. In this case, the SSD collects states at the time of occurrence of an error or failure and stores the same as dump data. The collected dump data is transmitted to a host to which the SSD is connected. The dump data transmitted to the host is provided to a debugging tool or a debugging apparatus, and dump data-based debugging is performed.

As the capacity and complexity of an SSD increases, the size of dump data also increases. Particularly, the collection and extraction of dump data as large as possible is required for detailed failure analysis. In this case, the transmission of dump data to a debugging channel provided for the failure analysis of the SSD causes a difficulty in rapid analysis due to the limitation of the transmission speed. Thus, it is difficult to perform accurate debugging on the SSD by rapidly obtaining real-time state information at the time of occurrence of a failure or error.

SUMMARY

The inventive concept provides a storage device capable of providing log data about a selectively extracted context to a host and an operating method of the storage device.

According to an aspect of the inventive concept, a storage device includes a plurality of components. The storage device includes a storage controller configured to receive a get log page command from a host and transmit, to the host, log data about at least one context, but not all contexts, selected from among respective contexts of the plurality of components according to the get log page command, and a memory storing the log data. The get log page command includes selection information for selecting at least one component from among the plurality of components.

According to another aspect of the inventive concept, a storage device includes a plurality of components. The storage device includes a memory and a storage controller. The storage controller is configured to detect an error event indicating that an error has occurred in at least one component among the plurality of components, generate log data about at least one context of a plurality of contexts of the at least one component in response to the error event, and control the memory to store the log data, the log data consisting of the at least one context, but not all of the plurality of contexts.

According to another aspect of the inventive concept, an operating method of a storage device including a plurality of components The operating method includes a receiving operation of receiving a get log page command from a host, a selecting operation of selecting at least one context, but not all contexts, from among respective contexts of the plurality of components in response to the get log page command, a generating operation of generating log data about the selected at least one context, and a transmitting operation of transmitting the log data to the host, wherein the get log page command includes selection information for selecting at least one component from among the plurality of components.

According to another aspect of the inventive concept, an operating method of a storage device including a plurality of components includes a detecting operation of detecting an error event indicating that an error has occurred in at least one component among the plurality of components, a generating operation of generating log data about a sub-context of the at least one component in response to the error event, and a storing operation of storing the log data.

BRIEF DESCRIPTION OF THE DRAWINGS

Embodiments of the inventive concept will be more clearly understood from the following detailed description taken in conjunction with the accompanying drawings in which:

FIG. 5 is a diagram for describing data in a human-readable format according to an embodiment of the inventive concept;

FIG. 6 is a diagram for describing data in a human-readable format according to an embodiment of the inventive concept;

DETAILED DESCRIPTION OF THE EMBODIMENTS

Hereinafter, embodiments of the inventive concept will be described in detail with reference to the accompanying drawings.

Figure 1:
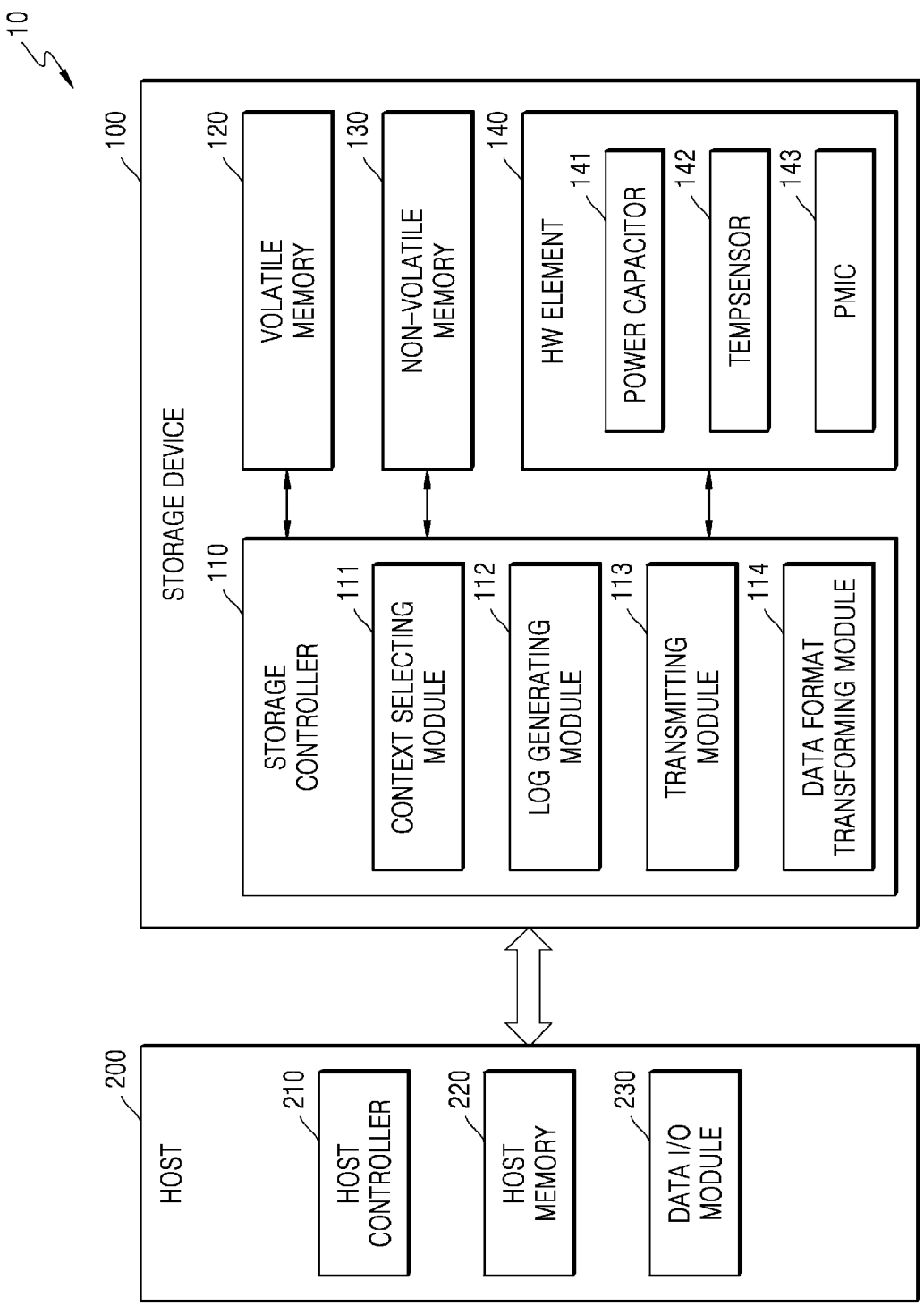
FIG. 1 is a diagram for describing a storage system according to an embodiment of the inventive concept.

FIG. 1 is a diagram for describing a storage system according to an embodiment of the inventive concept.

Referring to FIG. 1, a storage system 10 may include a storage device 100 and a host 200.

The storage device 100 may include a plurality of components. In the storage device 100 and other storage devices described in the various embodiments and descriptions herein, the components may be implemented in a hardware form, in a software form, and in a hardware and software form. Herein, the components may be referred to as elements. Referring to FIG. 1, for example, the storage device 100 may include a storage controller 110, a volatile memory 120, a non-volatile memory 130, and a hardware element 140. However, the inventive concept is not limited thereto.

The storage device 100 may include storage mediums for storing data according to the request from the host 200. As an example, the storage device 100 may include at least one of a solid state drive (SSD), an embedded memory, and a removable external memory. When the storage device 100 is an SSD, the storage device 100 may be a device conforming to the Non-Volatile Memory express (NVMe) standard (specifications). When the storage device 100 is an embedded memory or an external memory, the storage device 100 may be a device conforming to the Universal Flash Storage (UFS) or embedded Multi-Media Card (eMMC) standard. The host 200 and the storage device 100 may each generate a packet according to an adopted standard protocol and transmit the same.

The storage controller 110 may control an overall operation of the storage device 100. Herein, the storage controller 110 may also be referred to as a controller, a device controller, or a memory controller.

When power is applied to the storage device 100 from the outside, the storage controller 110 may execute firmware. When the non-volatile memory 130 is a flash memory device, the firmware may include a host interface layer (HIL), a flash translation layer (FTL), and a flash interface layer (FIL).

The storage controller 110 may control the volatile memory 120 or the non-volatile memory 130 to perform a program operation (or a write operation), a read operation, and an erase operation in response to a write request, a read request, and an erase request of the host 200 respectively.

During the program operation, the storage controller 110 may provide a program command, a physical address, and write data to the non-volatile memory 130.

During the read operation, the storage controller 110 may provide a read command and a physical address to the non-volatile memory 130.

During the erase operation, the storage controller 110 may provide an erase command and a physical address to the non-volatile memory 130.

The storage controller 110 may transmit a command, an address, and data generated by itself to the non-volatile memory 130 regardless of the request received from the host 200. For example, the storage controller 110 may generate a command, an address, and data for performing a background operation and provide the command, the address, and the data to the non-volatile memory 130. The background operation may be, for example, wear leveling, read reclaim, or garbage collection.

The storage controller 110 may control a plurality of non-volatile memories 130 logically operated as one non-volatile memory 130.

In an embodiment, the storage controller 110 may receive a get log page command from the host 200 and transmit, to the host 200, log data about at least one context selected from among the respective contexts of the plurality of components according to the get log page command. The get log page command may be a command for requesting to provide the log data stored in the storage device 100. The get log page command may be defined in the NVMe standard. The log data may be data representing information about the current context of a particular component. The log data may be unstructured data, for example, data of a format readable by a computer (or a machine), and may be data represented in binary numbers.

The get log page command may include selection information. The selection information may be information representing a selected component among the components constituting the storage device 100. This will be described below in detail with reference to FIG. 3.

In another embodiment, the storage controller 110 may detect an error event and generate log data in response to the error event. The error event may be an event indicating that an error has occurred in at least one component among the plurality of components. Particularly, in response to the error event, the storage controller 110 may generate log data about the context of at least one component in which an error has occurred. The context may include, for example, a state of the component, a status or condition relating to the component, a particular parameter associated with the component, or the like. In some cases, the context may refer to information about a set of categories of data about a component, as depicted and described in greater detail below in connection with FIGS. 5 and 6, for example.

According to an embodiment, the storage controller 110 may include a context selecting module 111, a log generating module 112, a transmitting module 113, and a data format changing module 114. The context selecting module 111, the log generating module 112, the transmitting module 113, and the data format changing module 114, as well as other modules described in the various embodiments herein, may be implemented as hardware or may be implemented as hardware and software. In an embodiment, the context selecting module 111, the log generating module 112, the transmitting module 113, and the data format changing module 114 may be implemented as firmware.

In an embodiment, the context selecting module 111 may select at least one context (e.g., a context of a particular component) based on the selection information and generate context information about the selected context.

In another embodiment, the context selecting module 111 may select the context of at least one component in response to the error event and generate context information about the selected context.

The log generating module 112 may generate log data based on the context information. Also, the log generating module 112 may control the volatile memory 120 or the non-volatile memory 130 to store the generated log data.

The transmitting module 113 may transmit a signal or data generated in the storage device 100 to the host 200.

The data format changing module 114 may process the log data to convert the log data, for example, into data in a human-readable format. The human-readable format may be a standard format that the user may read by using a display device or the like. The human-readable format may be, for example, JavaScript Object Notation (JSON), eXtensible Markup Language (XML), or Character-Separated Values (CSV); however, the inventive concept is not limited thereto.

In FIG. 1, the context selecting module 111, the log generating module 112, the transmitting module 113, and the data format changing module 114 are included in the storage controller 110; however, the inventive concept is not limited thereto. Particularly, the context selecting module 111, the log generating module 112, the transmitting module 113, and the data format changing module 114 may be included in a processor implemented separately from the storage controller 110.

The volatile memory 120 may operate in response to the control by the storage controller 110 only while receiving power. The volatile memory 120 may temporarily store the data received from the host 200 or the data received from the non-volatile memory 130, only while receiving power. As a buffer memory, the volatile memory 120 may be included in the storage controller 110 or arranged outside the storage controller 110. For example, the volatile memory devices may include DRAMs, SRAMs, or the like.

In an embodiment, the volatile memory 120 may store the log data.

The non-volatile memory 130 may operate in response to the control by the storage controller 110. Particularly, the non-volatile memory 130 may receive a command and an address from the storage controller 110 and access a memory cell selected by the address from among memory cells (not illustrated). The non-volatile memory 130 may perform an operation indicated by a command on the memory cell selected by the address.

The command may be, for example, a program command, a read command, or an erase command, and the operation indicated by the command may be, for example, a program operation (or a write operation), a read operation, or an erase operation. The program operation may be an operation in which the non-volatile memory 130 stores the data received from the host 200 in response to the control by the storage controller 110. The read operation may be an operation in which the non-volatile memory 130 reads the read data stored in the non-volatile memory 130 in response to the control by the storage controller 110. The erase operation may be an operation in which the non-volatile memory 130 erases the data stored in the memory device in response to the control by the storage controller 110.

According to an embodiment, the non-volatile memory 130 may be implemented as a single chip or memory die, or as a plurality of memory chips or a plurality of memory dies. For example, each of the plurality of memory chips may be a Dual Die Package (DDP), a Quadruple Die Package (QDP), or an Octuple Die Package (ODP).

As an example, the non-volatile memory 130 may be, for example, a flash memory. The flash memory may include, for example, a NAND flash memory, a NOR flash memory, or the like. When the non-volatile memory 130 includes a flash memory, the flash memory may include a 2D NAND memory array or a 3D (or vertical) NAND (VNAND) memory array.

As another example, the storage device 100 may include various other types of non-volatile memories. For example, the storage device 100 may include magnetic RAMs (MRAMs), spin-transfer torque MRAMs, conductive bridging RAMs (CBRAMs), ferroelectric RAMs (FeRAMs), phase-change RAMs (PRAM), resistive memories (resistive RAMs), and various other types of memories.

In an embodiment, the non-volatile memory 130 may store the log data. In another embodiment, the non-volatile memory 130 may include a plurality of non-volatile memories, and a separate non-volatile memory storing only the log data among the plurality of non-volatile memories may be provided in the storage device 100.

The host 200 may communicate with the storage device 100 through an interface. Here, the interface may be implemented as, for example, NVMe, NVMe Management Interface (NVMe MI), or NVMe over Fabric (NVMe-oF).

In an embodiment, the host 200 may provide the storage device 100 with a write request for requesting to store data in the storage device 100. Also, the host 200 may provide the storage device 100 with a write request, data, and a logical address for identifying the data. The storage device 100 may store the write data including the data and metadata provided by the host 200 in the non-volatile memory 130 in response to the write request received from the host 200 and provide the host 200 with a response indicating the completion of storage.

In another embodiment, the host 200 may provide a get log page command to the storage device 100.

The host 200 may include a host controller 210, a host memory 220, and a data input/output module 230. The host controller 210 may control an overall operation of the host 200. The host memory 220 may function as a buffer memory for temporarily storing the data to be transmitted to the storage device 100 or the data received from the storage device 100. The data input/output module 230 may transmit the data stored in the host memory 220 to the storage device 100 or transmit the data to be stored in the host memory 220 to the storage device 100.

The hardware element 140 may include a power capacitor 141, a temperature sensor 142, and a power management integrated circuit (PMIC) 143. However, the inventive concept is not limited thereto. The power capacitor 141 may store backup power. The temperature sensor 142 may sense an internal temperature of the storage device 100. The PMIC 143 may manage power supplied from the outside.

Figure 2:
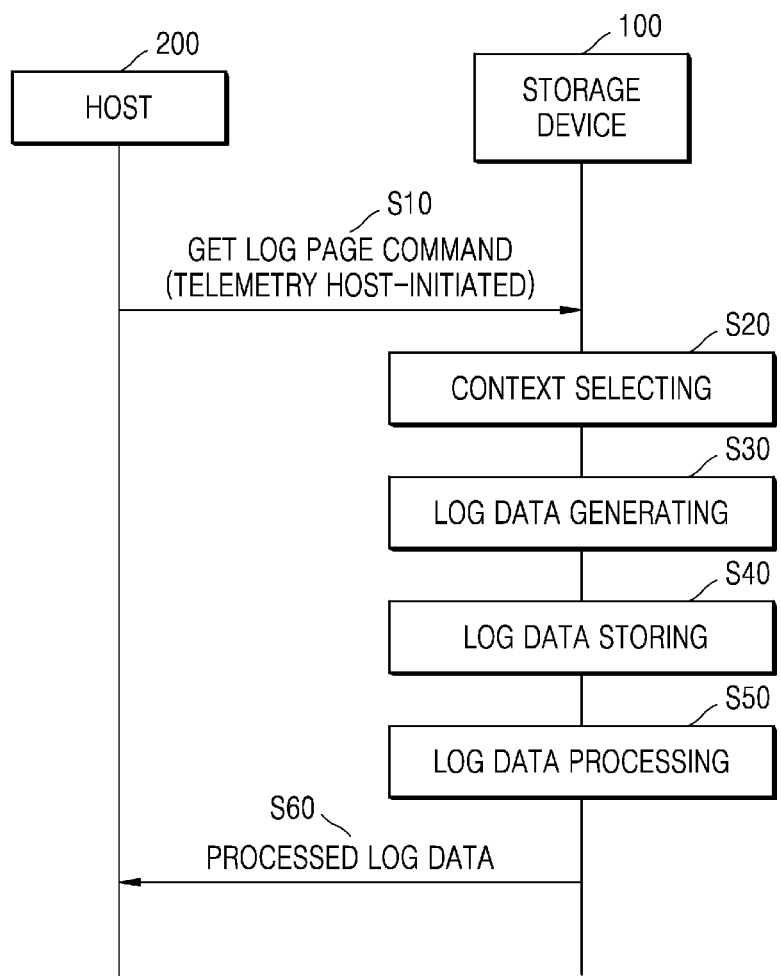
FIG. 2 is a diagram for describing an operating method of a storage system according to an embodiment of the inventive concept.

FIG. 2 is a diagram for describing an operating method of a storage system according to an embodiment of the inventive concept.

Referring to FIG. 2, operation S10 may be referred to as a receiving operation. In operation S10, the host 200 transmits a get log page command to the storage device 100. Then, the storage device 100 receives the get log page command. The get log page command may include bit information (or a bit value) corresponding to telemetry host-initiated. The telemetry host-initiated indicator may indicate that the host 200 initiates telemetry. The telemetry host-initiated indicator may be defined in the NVMe standard (e.g., 5.16.18 based on NVMe standard 2.0a). This will be described below with reference to FIG. 3. The get log page command may include the selection information described above.

Operation S20 may be referred to as a selecting operation. In operation S20, the storage device 100 selects at least one context from among the respective contexts of the plurality of components in response to the get log page command. For example, when the selection information is information for selecting the non-volatile memory 130, the storage device 100 may select the current context of the non-volatile memory 130 by using the selection information included in the get log page command.

Operation S30 may be referred to as a generating operation. In operation S30, the storage device 100 generates log data about the selected at least one context. For example, the storage device 100 may snapshot the currently-selected context and generate log data representing the snapshotted current context.

Operation S40 may be referred to as a storing operation. In operation S40, the storage device 100 stores the generated log data in a memory (e.g., the volatile memory 120 or the non-volatile memory 130).

Operation S50 may be referred to as a processing operation. Alternatively, operation S50 may be referred to as a loading operation and a changing operation. In operation S50, the storage device 100 may load the stored log data and process the loaded log data such that the format of the loaded log data may be changed into a human-readable format.

Operation S60 may be referred to as a transmitting operation. In operation S60, the storage device 100 transmits the log data to the host 200. For example, the storage device 100 may transmit, to the host 200, the log data loaded from the memory (e.g., the volatile memory 120 or the non-volatile memory 130). For example, the storage device 100 may transmit, to the host 200, the log data changed into the human-readable format.

Figure 3:
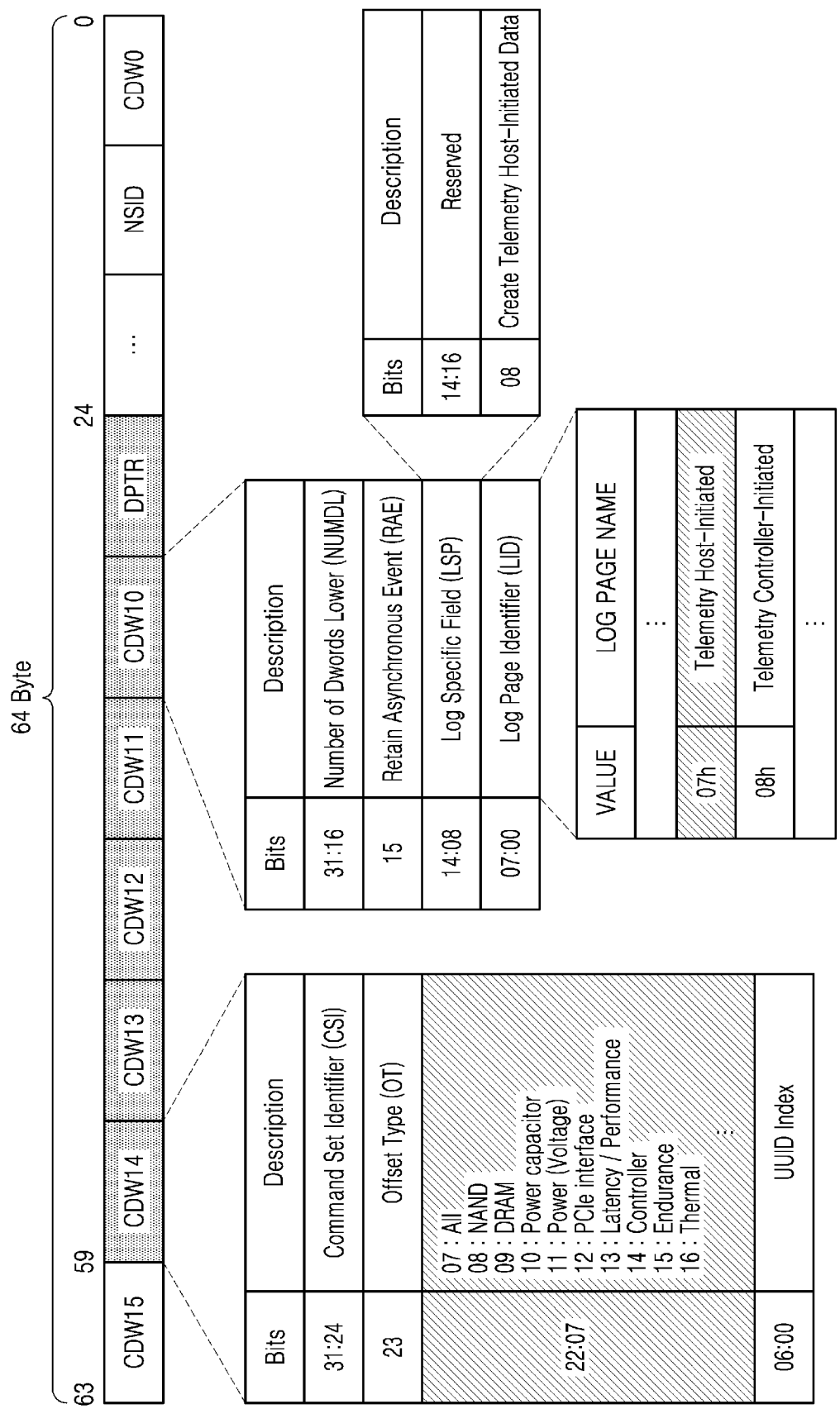
FIG. 3 is a diagram for describing a command provided by a host according to an embodiment of the inventive concept.

FIG. 3 is a diagram for describing a command provided by a host according to an embodiment of the inventive concept.

Referring to FIG. 3, the command (or request) provided by the host 200 may be a command defined in the NVMe standard, and a command queue entry may be a submission queue entry defined in the NVMe standard. The size of the command provided by the host 200 may be 64 bytes. The command provided by the host 200 may include, for example, 16 command double words. One command double word may be data having a size of 4 bytes.

According to an embodiment, the command provided by the host 200 may include a command double word 0 (CDW 0), a namespace identifier (NSID), a data pointer (DPTR), a command double word 10 (CDW 10), a command double word 11 (CDW 11), a command double word 12 (CDW 12), a command double word 13 (CDW 13), a command double word 14 (CDW 14), and a command double word 15 (CDW 15).

In an embodiment, the get log page command provided by the host 200 may be a command to which the NVMe standard (e.g., 5.16 in the NVMe standard 2.0a) is applied. The get log page command provided by the host 200 may include a data pointer (DPTR), a command double word 10 (CDW 10), a command double word 11 (CDW 11), a command double word 12 (CDW 12), a command double word 13 (CDW 13), and command double word 14 (CDW 14).

The data pointer (DPTR) may be a field specifying data used in the command. The data pointer (DPTR) may be a field specifying the start point of a data buffer in the host memory 220.

The command double word 10 (CDW 10) may include Number of Dwords Lower (NUMDL), Retain Asynchronous Event (RAE), Log Specific Field (LSP), and Log Page Identifier (LID). The NUMDL may be a field specifying the least significant 16 bits unless otherwise specified. The RAE may be a field specifying when to retain or delete an asynchronous event and may have a size of 1 bit. The LSP may be a field representing the log defined by the LID and may have a size of 7 bits. The LID may be a field representing the identifier of a log page to be searched and may have a size of 7 bits.

In an embodiment, the LID may represent bit information corresponding to telemetry host-initiated. The bit information corresponding to the telemetry host-initiated may be, for example, "07h".

When the LID includes the bit information corresponding to the telemetry host-initiated, the LSP may include bit information supporting to generate telemetry host-initiated data. The size of the bit information supporting to generate the telemetry host-initiated data may be 1 bit.

The command double word 11 (CDW 11) may include a field specifying the identifier required in a particular log page and a field specifying the most significant 16 bits unless otherwise specified.

The command double word 12 (CDW 12) may include a field specifying where to start returning data in a log page, unless otherwise specified.

The command double word 13 (CDW 13) may include a field specifying a log page offset or the most significant 32 bits of an index in the list of data structures.

The command double word 14 (CDW 14) may include a command set identifier (CSI), an offset type (OT), selection information, and a universally unique identifier (UUID) index (UUID INDEX). The CSI may include bit information corresponding to a NVM command set, bit information corresponding to a key value command set, and/or bit information corresponding to a zoned namespace command set. The OT may have a first value or a second value. When the OT has the first value, the command double word 12 (CDW 12) and the command double word 13 (CDW 13) may specify the index of the list of data structures in the log page to be returned. When the OT has the second value, the command double word 12 (CDW 12) and the command double word 13 (CDW 13) may specify the byte offset in the log page to be returned.

The selection information may be information for selecting at least one component from among the plurality of components constituting the storage device 100. The selection information may have a value of 16 bits. However, the inventive concept is not limited thereto. Each bit of the selection information may correspond to the plurality of components constituting the storage device 100. When each bit of the selection information has a particular value (e.g., "1"), the component corresponding to the bit may be selected, and when each bit of the selection information has a value (e.g., "0") different from a particular value, the component corresponding to the bit may not be selected. Referring to FIG. 3, for example, the seventh bit digit of the selection information may represent all the components of the storage device 100. The eighth bit digit of the selection information may represent the non-volatile memory 130 (e.g., NAND). The ninth bit digit of the selection information may represent the volatile memory 120 (e.g., DRAM). The tenth bit digit of the selection information may represent the power capacitor 141. The eleventh bit digit of the selection information may represent the supply power of the storage device 100. The twelfth bit digit of the selection information may represent the Peripheral Component Interconnect express (PCIe) interface of the storage device 100. The thirteenth bit digit of the selection information may represent the latency and/or performance of the storage device 100. The fourteenth bit digit of the selection information may represent the storage controller 110. The fifteenth bit digit of the selection information may represent the endurance of the storage device 100. The sixteenth bit digit of the selection information may represent the thermal information of the storage device 100. However, the inventive concept is not limited thereto.

Although not illustrated, the command provided by the host 200 may further include a command double word 2, a command double word 3, and a metadata pointer.

Figure 4:
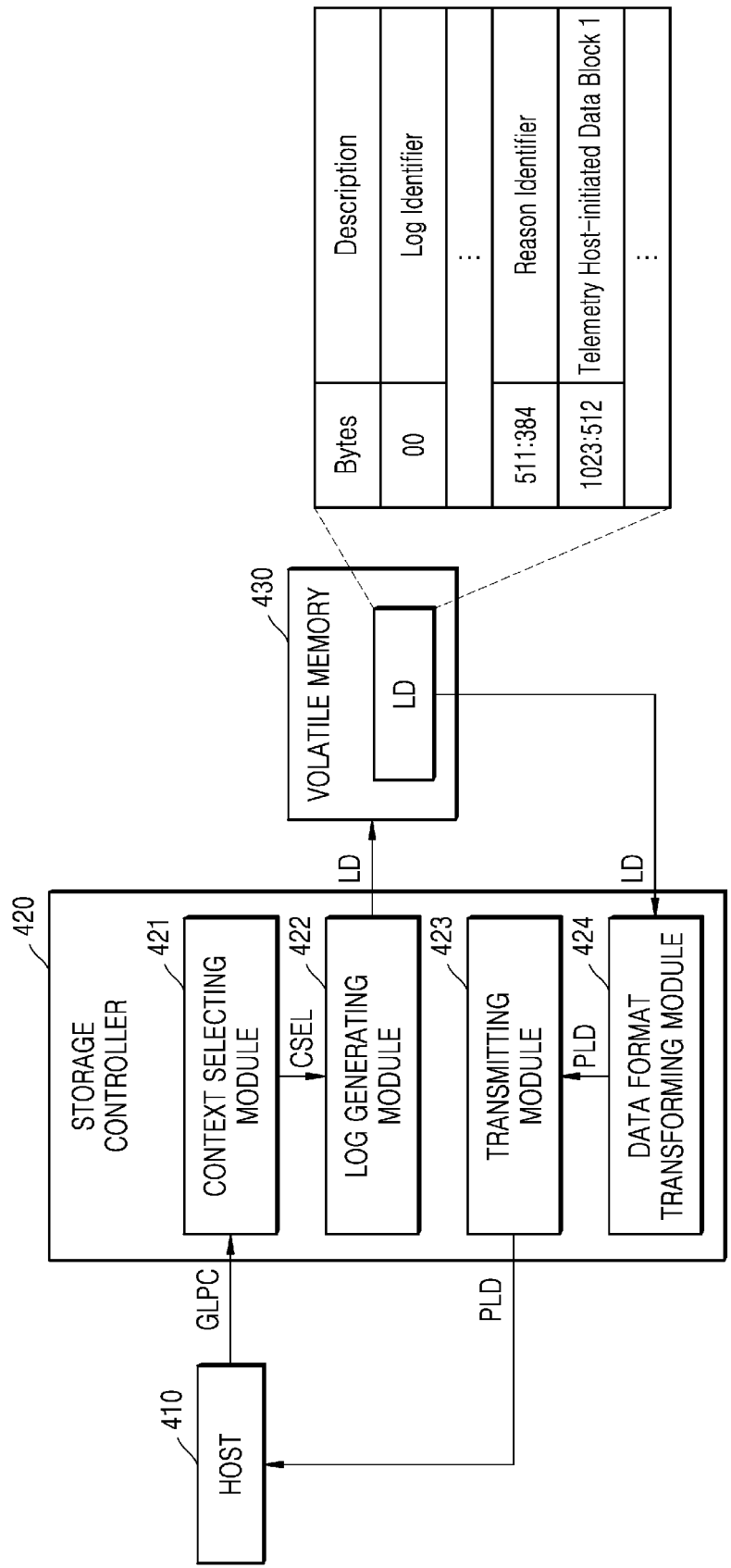
FIG. 4 is a diagram for describing an operating method of a storage device according to an embodiment of the inventive concept.

FIG. 4 is a diagram for describing an operating method of a storage device according to an embodiment of the inventive concept.

Referring to FIGS. 3 and 4, a host 410 may perform the same function as the host 200 illustrated in FIG. 1. The host 410 transmits a get log page command GLPC to a storage controller 420. The get log page command GLPC may include a command double word 14 including selection information as illustrated in FIG. 3.

The storage controller 420 may include a context selecting module 421, a log generating module 422, a transmitting module 423, and a data format changing module 424.

The context selecting module 421 receives the get log page command GLPC. The context selecting module 421 may identify a selected component by using the selection information included in the get log page command GLPC. The context selecting module 421 may provide the log generating module 422 with a context selection signal CSEL representing the context information of the selected component.

The log generating module 422 receives the context selection signal CSEL. The log generating module 422 may snapshot the current context of the selected component and generate log data LD representing the current context. The log generating module 422 provides the log data LD, a write command, and an address to a volatile memory 430.

The log data LD may be stored in the volatile memory 430. The log data LD may include a log identifier representing the bit value of the LID, a reason identifier representing identification information representing the unique operation condition of the storage controller, and a telemetry host-initiated data block (Telemetry Host-initiated Data Block 1) for a telemetry host-initiated log. However, the inventive concept is not limited thereto.

The data format changing module 424 (also described as a data format transforming module) may control the volatile memory 430 to load the log data LD stored in the volatile memory 430. The data format changing module 424 may process the log data LD by changing the loaded log data LD into data in a human-readable format. The data format changing module 424 may output processed log data PLD to the transmitting module 423.

The transmitting module 423 transmits the processed log data PLD to the host 410. The size of the processed log data PLD may be less than or equal to the size of log data about all the contexts of the storage device 100, and thus the processed log data PLD may consist of selected log data about selected contexts (also described as sub-contexts), but not all log data about all the contexts of the storage device 100.

As described above, by providing the log data about the selectively extracted context to the host, the data transmission size may be reduced and the transmission speed between the host and the storage device may be increased due to the reduction of the data transmission size.

Also, as described above, the latency that may occur in the host may be reduced by transmitting log data of a smaller size to the host.

FIG. 5 is a diagram for describing data in a human-readable format according to an embodiment of the inventive concept.

Referring to FIGS. 3 and 5, it is assumed that the eighth bit digit of the selection information represents the non-volatile memory 130. Also, it is assumed that the non-volatile memory 130 is selected because the eighth bit digit of the selection information has a particular value (e.g., "1").

The processed log data PLD may represent context information of the non-volatile memory 130. The context information may include variables and values. For example, the context information included in the processed log data PLD may include a read error rate having a value of a, a write error rate having a value of b, and unrecoverable write errors having a value of c, read recovery attempts having a value of d, and/or the like. However, the inventive concept is not limited thereto.

Because the processed log data PLD is data in a human-readable format, the user may easily read the context information of the non-volatile memory 130.

FIG. 6 is a diagram for describing data in a human-readable format according to an embodiment of the inventive concept.

Referring to FIG. 6, it is assumed that first to fourth processed log data PLD1, PLD2, PLD3, and PLD4 are data in a human-readable format and the human-readable format is JSON. It is assumed that the first processed log data PLD1 represents context information of NAND. It is assumed that the second processed log data PLD2 represents context information of performance (and/or latency). It is assumed that the third processed log data PLD3 represents context information of endurance. It is assumed that the fourth processed log data PLD4 represents context information of Thermal information. The second, third, and fourth processed log data PLD2, PLD3, and PLD4 may each be associated with one or more components of a storage device (e.g., an input/output interface, a memory array, and a processor or other component).

The user may easily read the context information of NAND from the first processed log data PLD1. In the case of the first processed log data PLD1, the value of Read Error Rate may be 0, the value of Write Error Rate may be 0, the value of Unrecoverable Write Errors may be 0, and the value of Read Recovery Attempts may be 10. However, the inventive concept is not limited thereto.

The user may easily read the context information of performance from the second processed log data PLD2. In the case of the second processed log data PLD2, the value of Throughput Performance may be 0 and the value of Perf Indicator may be 1. However, the inventive concept is not limited thereto.

The user may easily read the context information of endurance from the third processed log data PLD3. In the case of the third processed log data PLD3, the value of Timed Workload Media may be 16, the value of Lifetime NAND Writes may be 2808, and the value of Lifetime Wear Level Count (Lifetime Wear Level Cnt) may be 617. However, the inventive concept is not limited thereto.

The user may easily read the context information of Thermal from the fourth processed log data PLD4. In the case of the fourth processed log data PLD4, the value of Highest Temperature may be 132, the value of Lowest Temperature may be 130, and the value of Current Temperature may be 131. However, the inventive concept is not limited thereto.

As described above, by providing the log data in the human-readable format to the host, particularly separated based on different contexts, the user may easily analyze the state of the storage device.

Also, as described above, because the user analyzes the state of the storage device in a normal state by using the log data in the human-readable format, the error of the storage device may be recovered in advance and thus the reliability of the storage device may be improved.

Figure 7:
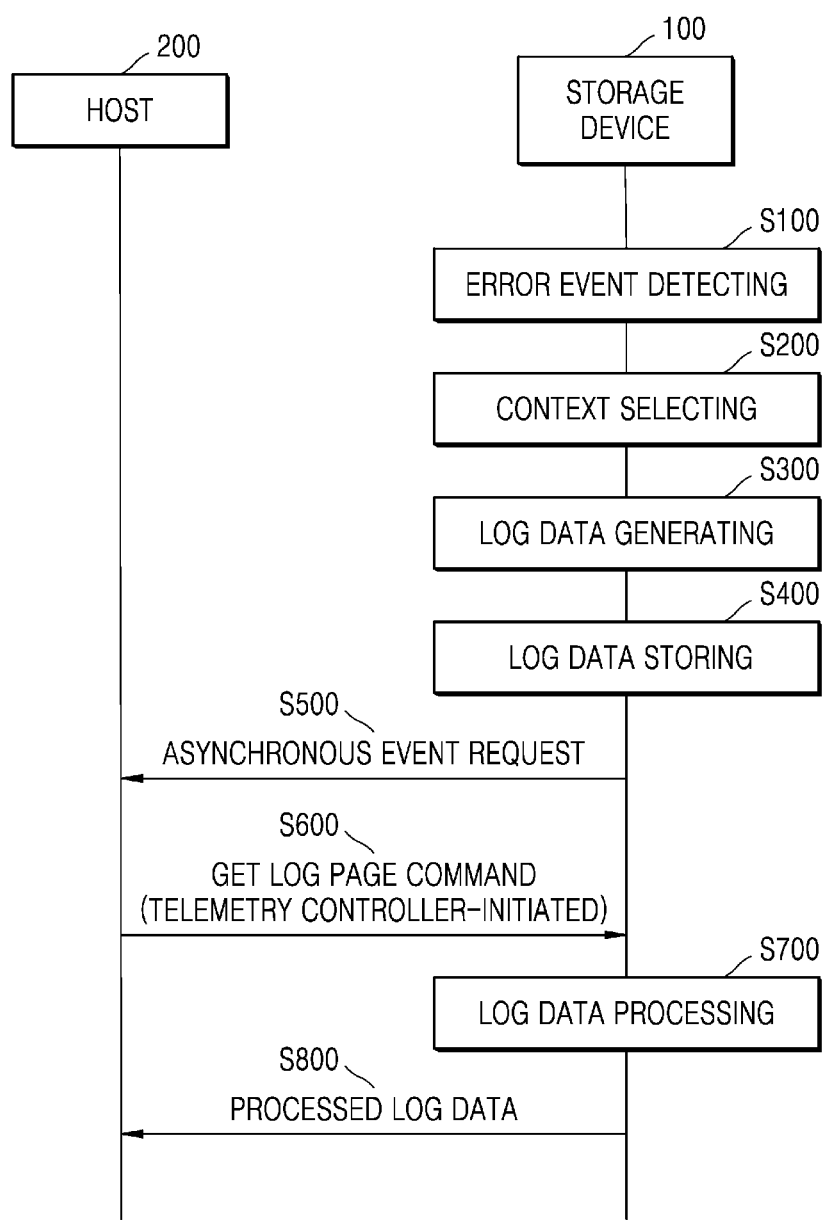
FIG. 7 is a diagram for describing an operating method of a storage system according to another embodiment of the inventive concept.

FIG. 7 is a diagram for describing an operating method of a storage system according to another embodiment of the inventive concept.

Referring to FIG. 7, operation S100 may be referred to as a detecting operation. In operation S100, the storage device 100 may detect an error event. The error event may be an event indicating that an error has occurred in at least one component among the plurality of components. A period in which the storage device 100 detects an error event may be preset (e.g., it may periodically detect errors based on pre-set timing parameters).

Operation S200 may be referred to as a selecting operation. In operation S200, the storage device 100 selects at least one context from among the respective contexts of the plurality of components in response to the error event. For example, when an error occurs in the non-volatile memory 130, the storage device 100 may select the current context of the non-volatile memory 130.

Operation S300 may be referred to as a generating operation. In operation S300, the storage device 100 generates log data about the selected at least one context of the component. Operation S300 may be the same as operation S20 described above with reference to FIG. 2.

Operation S400 may be referred to as a storing operation. Operation S400 may be the same as operation S40 described above with reference to FIG. 2.

Operation S500 may be referred to as a request transmitting operation. In operation S500, the storage device 100 transmits an asynchronous event request signal to the host 200. The asynchronous event request signal may be a signal for notifying the host 200 of error information generated in the storage device 100 or state information of the storage device 100. The asynchronous event request signal may be a command defined in the NVMe standard (e.g., 5.2 of NVMe standard 2.0a).

Operation S600 may be referred to as a receiving operation. In operation S600, the host 200 transmits a get log page command to the storage device 100. Then, the storage device 100 receives the get log page command. The get log page command may include bit information corresponding to telemetry controller-initiated. The telemetry controller-initiated indicator may indicate that the storage controller 110 initiates telemetry. The telemetry controller-initiated indicator may be defined in the NVMe standard (e.g., 5.16.19 based on NVMe standard 2.0a). Also, the get log page command may further include selection information for selecting at least one component.

Operation S700 may be referred to as a processing operation. Alternatively, operation S700 may be referred to as a loading operation and a changing operation. Operation S700 may be the same as operation S50 described above with reference to FIG. 2.

Operation S800 may be referred to as a transmitting operation. Operation S800 may be the same as operation S60 described above with reference to FIG. 2.

Figure 8:
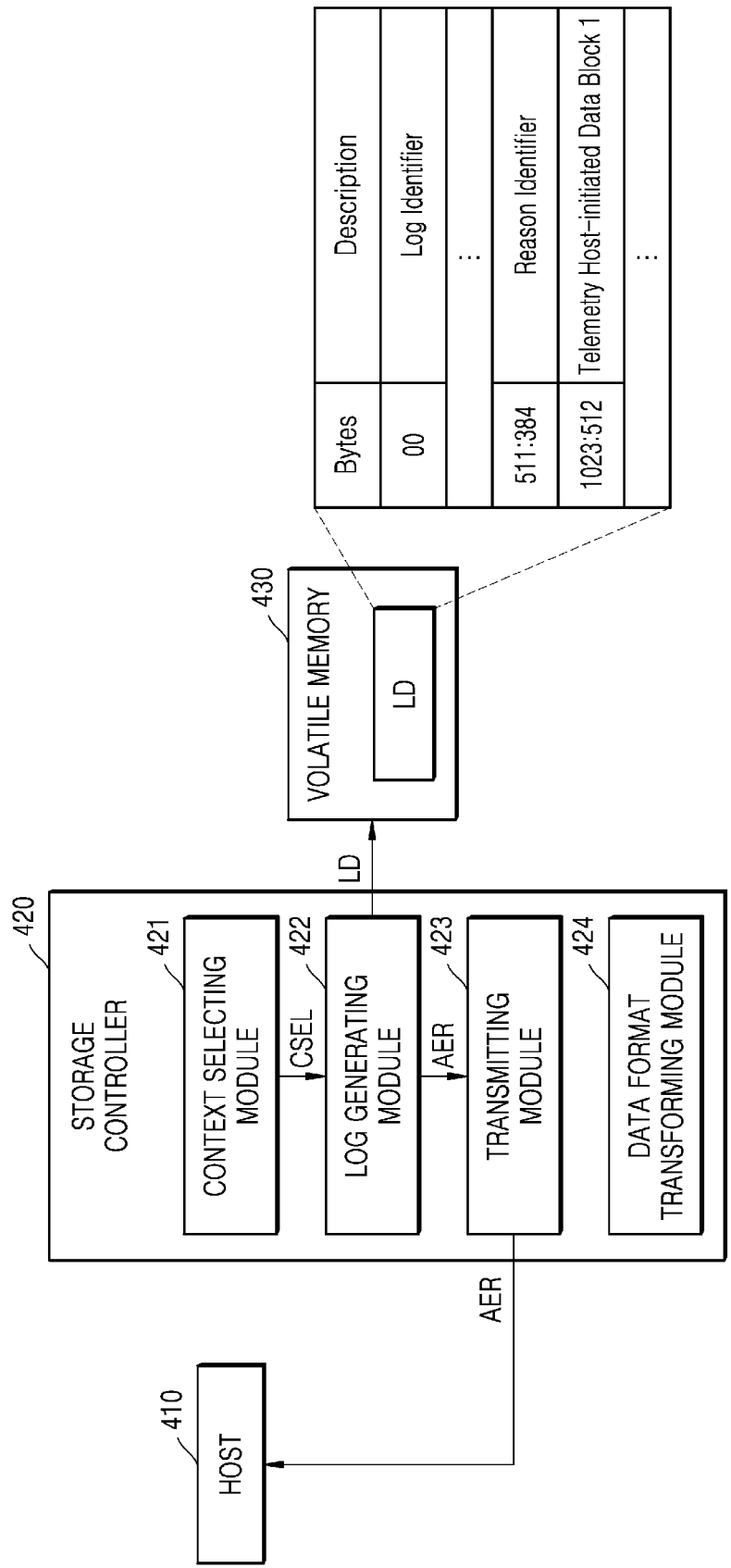
FIG. 8 is a diagram for describing an operating method of a storage device according to another embodiment of the inventive concept.

FIG. 8 is a diagram for describing an operating method of a storage device according to another embodiment of the inventive concept.

Referring to FIG. 8, the context selecting module 421 may detect an error event and identify at least one component in response to the error event. The context selecting module 421 may provide the log generating module 422 with a context selection signal CSEL representing the context information of the selected component.

The log generating module 422 may receive the context selection signal CSEL. The log generating module 422 may snapshot the current context of the selected component and generate log data LD representing the current context. The log generating module 422 may provide the log data LD, a write command, and an address to a volatile memory 430.

The log data LD may include a log identifier representing the bit value of the LID, a reason identifier representing identification information representing the unique operation condition of the storage controller, and a telemetry controller-initiated data block (Telemetry Controller-initiated Data Block 1) for a telemetry controller-initiated log. However, the inventive concept is not limited thereto.

The log generating module 422 may provide an asynchronous event request signal AER to the transmitting module 423 in response to the context selection signal CSEL.

The transmitting module 423 may transmit an asynchronous event request signal to the host 200.

After the asynchronous event request signal is transmitted to the host 200, the host 410 may transmit a get log page command to the storage controller 420 as described above with reference to FIG. 2. The get log page command may include a command double word 14 including selection information as illustrated in FIG. 3. Also, the data format changing module 424 may control the volatile memory 430 to load the log data in response to the get log page command. Also, the data format changing module 424 may convert the loaded log data into data in a human-readable format. Also, the transmitting module 423 may transmit, to the host 200, the log data converted into the data in the human-readable format.

As described above, by providing the log data about the selectively extracted context to the host, the data transmission size may be reduced and the transmission speed between the host and the storage device may be increased due to the reduction of the data transmission size.

Also, as described above, the latency that may occur in the host may be reduced by transmitting log data of a smaller size to the host.

Figure 9:
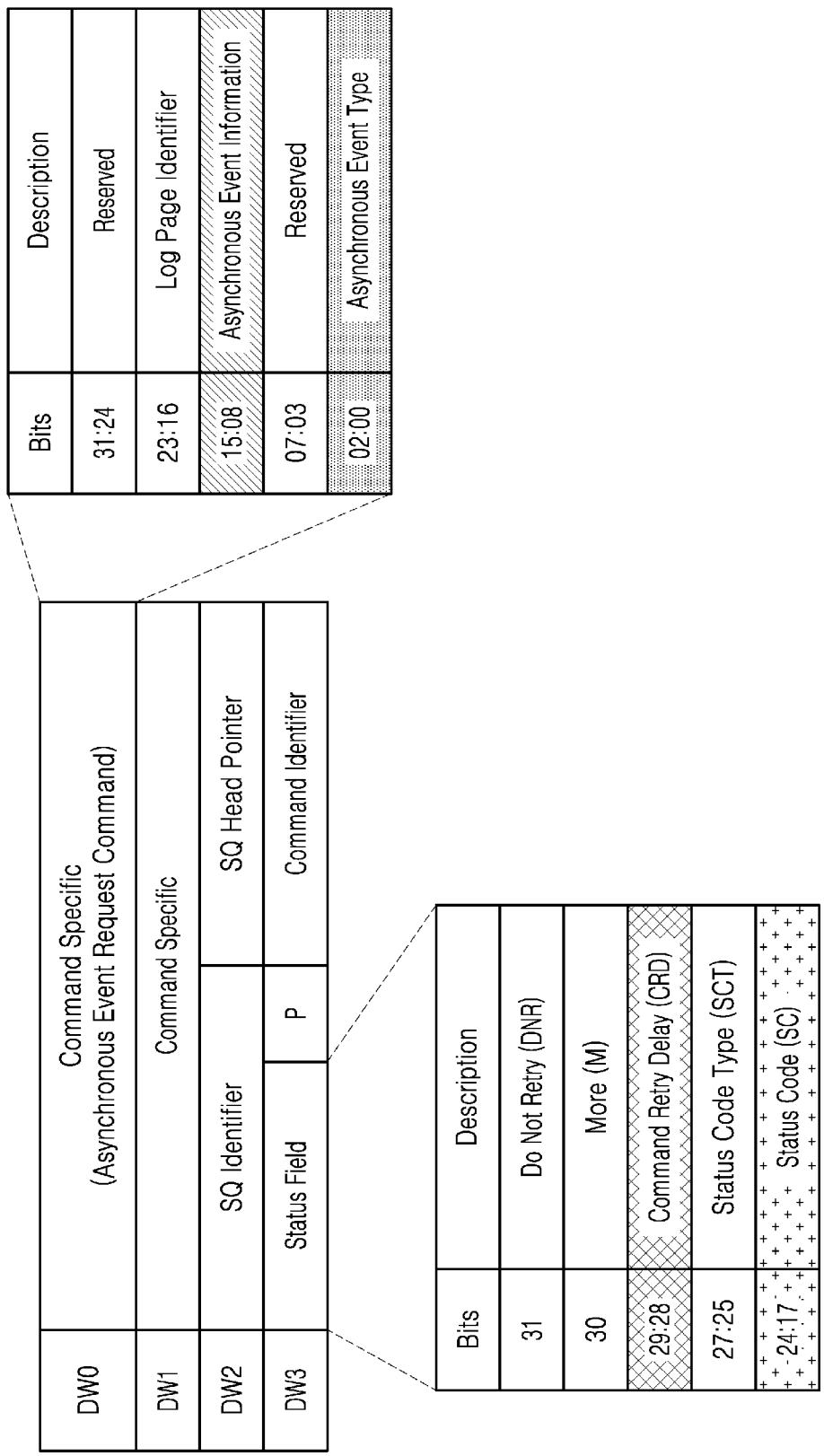
FIG. 9 is a diagram for describing a command queue entry about a command provided by a storage device according to another embodiment of the inventive concept.

FIG. 9 is a diagram for describing a command queue entry about a command provided by a storage device according to another embodiment of the inventive concept.

Referring to FIG. 9, the command provided by the storage device 100 may be a command defined in the NVMe standard, and a command queue entry may be a completion queue entry defined in the NVMe standard.

A command queue entry layout may be at least 16 bytes. The command queue entry may include a double word 0 (DW 0), a double word 1 (DW 1), a double word 2 (DW 2), and a double word 3 (DW 3).

The double word 0 (DW 0) may be a field including an asynchronous event request command. The asynchronous event request command may be referred to as the asynchronous event request signal described above. The asynchronous event request command may include a log page identifier, asynchronous event information, and an asynchronous event type. In an embodiment, the asynchronous event type may be a notice. In this case, the asynchronous event information may represent telemetry log changed. The telemetry log changed may correspond to "2h".

The double word 1 (DW 1) may include various information. The double word 2 (DW 2) may include a submission queue identifier (SQ Identifier) and a submission queue head pointer (SQ Head Pointer).

The double word 3 (DW 3) is a status field (Status Field) representing the state of a command being completed, a phase tag (P) identifying whether the completion queue entry is a new item, and a command identifier (Command Identifier) identifying the command being completed.

The status field may include Do Not Retry (DNR), More (M), Command Retry Delay (CRD), Status Code Type (SCT), and Status Code (SC). The DNR may have a first value (e.g., '1') or a second value (e.g., '0'). The DNR having the first value (e.g., '1') may indicate that when the same command is re-provided to the storage controller, the re-provided command is expected to fail. The DNR having the second value (e.g., '0') may indicate that when the same command is retried, the retried command may succeed. The More (M) may have a first value (e.g., '1') or a second value (e.g., '0'). The More (M) having the first value (e.g., '1') may indicate that there is additional information related to the get log page command. The More (M) having the second value (e.g., '0') may indicate that there is no additional information. The CRD may be a field for setting a delay time for retrying the command. The SCT may be a field representing the status code type of the completion queue entry. The SC may be a field representing state information about an indicated command or a status code identifying an error.

In an embodiment, when the SCT is "1h" and the SC is "05h", the SCT may represent Command Specific Status and the SC may represent Asynchronous Event Request Limit Exceeded. However, the inventive concept is not limited thereto.

Figure 10:
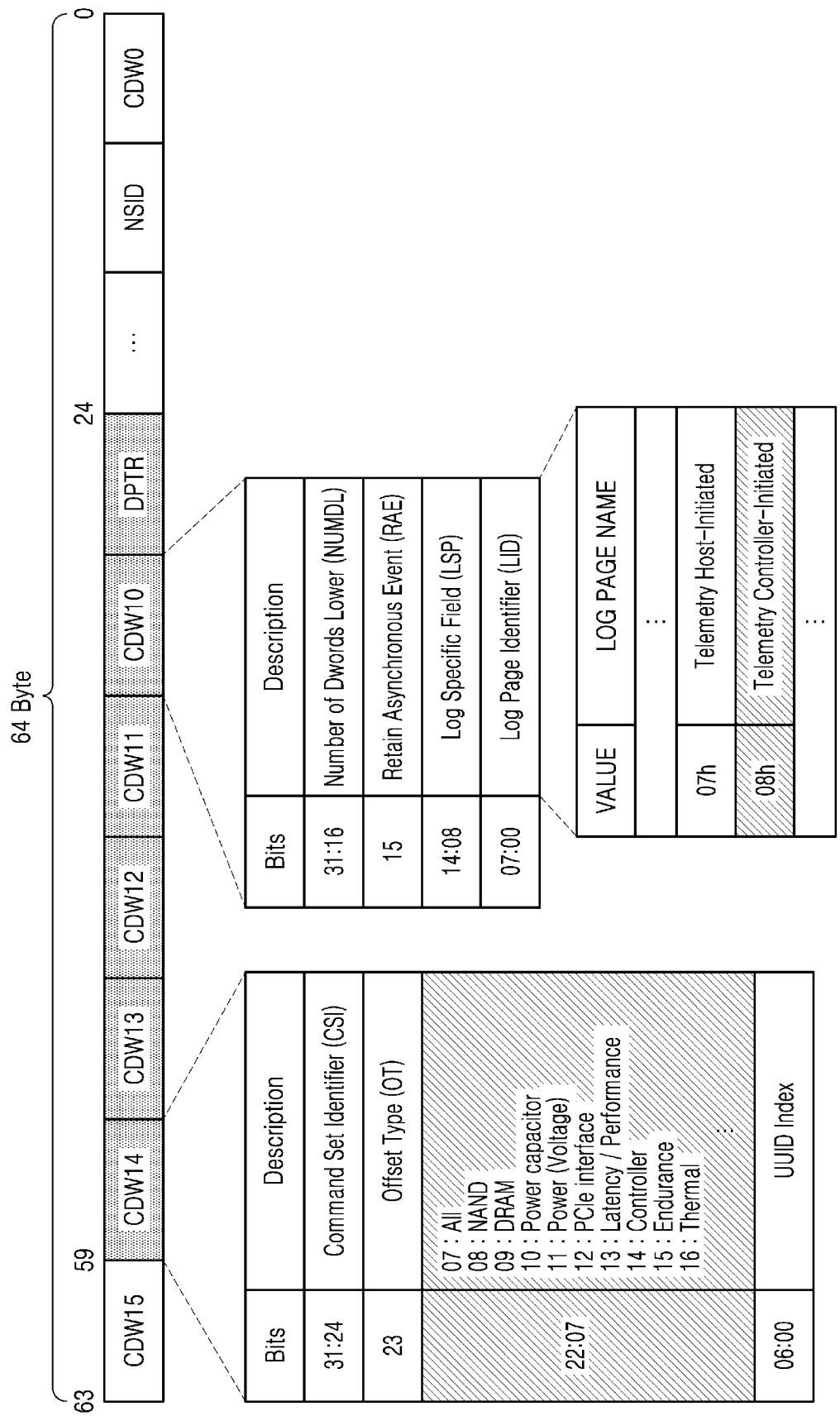
FIG. 10 is a diagram for describing a command provided by a host according to another embodiment of the inventive concept.

FIG. 10 is a diagram for describing a command provided by a host according to another embodiment of the inventive concept.

Referring to FIG. 10, the command provided by the host 200 according to another embodiment may be a get log page command as a command defined in the NVMe standard as described above with reference to FIG. 3 and may include a data pointer (DPTR), a command double word 10 (CDW 10), a command double word 11 (CDW 11), a command double word 12 (CDW 12), a command double word 13 (CDW 13), and a command double word 14 (CDW 14).

The command double word 10 (CDW 10) may include Number of Dwords Lower (NUMDL), Retain Asynchronous Event (RAE), Log Specific Field (LSP), and Log Page Identifier (LID).

In an embodiment, the LID may represent bit information corresponding to telemetry controller-initiated. The bit information corresponding to the telemetry controller-initiated may be, for example, "08h".

The command double word 14 (CDW 14) may include a command set identifier (CSI), an offset type (OT), selection information, and a universally unique identifier (UUID) index (UUID INDEX). In an embodiment, the selection information may be configured at the seventh bit digit to the 22nd bit digit of the command double word 14 (CDW14).

Figure 11:
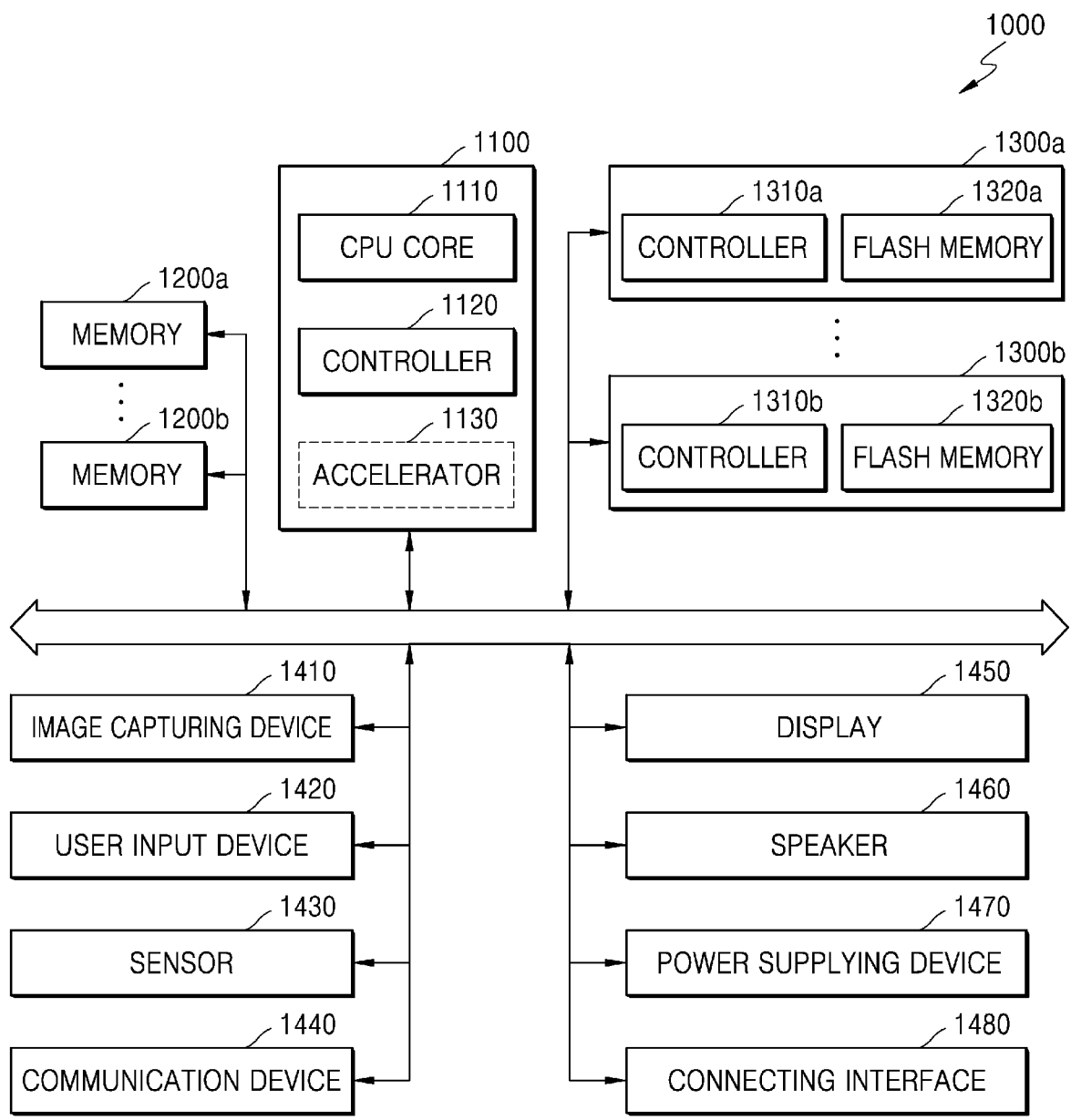
FIG. 11 is a diagram illustrating a system to which a storage device according to an embodiment of the inventive concept is applied.

FIG. 11 is a diagram illustrating a system to which a storage device according to an embodiment of the inventive concept is applied.

Referring to FIG. 11, a system 1000 may basically be a mobile system such as a portable communication terminal (mobile phone), a smart phone, a tablet personal computer (PC), a wearable device, a healthcare device, or an Internet of Things (IoT) device. However, the system 1000 is not necessarily limited to a mobile system and may also be, for example, a personal computer, a laptop computer, a server, a media player, or an automotive device such as a navigation device.

The system 1000 may include a main processor 1100, memories 1200a and 1200b, and storage devices 1300a and 1300b and may further include one or more of an image capturing device 1410, a user input device 1420, a sensor 1430, a communication device 1440, a display 1450, a speaker 1460, a power supply device 1470, and a connection interface 1480.

The main processor 1100 may control an overall operation of the system 1000, and more particularly, an operation of other components constituting the system 1000. The main processor 1100 may be implemented as, for example, a general-purpose processor, a dedicated processor, or an application processor.

The main processor 1100 may include one or more CPU cores 1110 and may further include a controller 1120 for controlling the memories 1200a and 1200b and/or the storage devices 1300a and 1300b. According to an embodiment, the main processor 1100 may further include an accelerator 1130 that is a dedicated circuit for high-speed data operation such as artificial intelligence (AI) data operation. The accelerator 1130 may include, for example, a graphics processing unit (GPU), a neural processing unit (NPU), and/or a data processing unit (DPU) and may be implemented as a separate chip that is physically independent from other components of the main processor 1100.

The memories 1200a and 1200b may be used as a main memory device of the system 1000 and may include volatile memories such as SRAMs and/or DRAMs or may include non-volatile memories such as flash memories, PRAMs, and/or RRAMs. The memories 1200a and 1200b may also be implemented in the same package as the main processor 1100.

The storage devices 1300a and 1300b may function as a non-volatile storage device that stores data regardless of whether power is supplied thereto, and may have a larger storage capacity than the memories 1200a and 1200b. The storage devices 1300a and 1300b may include storage controllers 1310a and 1310b and non-volatile memories (NVMs) 1320a and 1320b that store data under the control by the storage controllers 1310a and 1310b. The non-volatile memories 1320a and 1320b may include a flash memory having a two-dimensional (2D) structure or a three-dimensional (3D) vertical NAND (V-NAND) structure or may include other types of non-volatile memories such as PRAMs and/or RRAMs.

The storage devices 1300a and 1300b may be included in the system 1000 in a state physically separated from the main processor 1100 or may be implemented in the same package as the main processor 1100. Also, because the storage devices 1300a and 1300b may have the same shape as a solid state device (SSD) or a memory card, the storage devices 1300a and 1300b may be coupled to be detachably attached to other components of the system 1000 through an interface such as the connection interface 1480 described below. The storage devices 1300a and 1300b may be devices to which a standard protocol such as Universal Flash Storage (UFS), embedded Multi-Media Card (eMMC), or Non-Volatile Memory express (NVMe) is applied, but are not necessarily limited thereto. The storage devices 1300a and 1300b may be controlled, and may include the various components, as described previously in connection with FIGS. 1-10.

The image capturing device 1410 may capture a still image or a moving image and may include, for example, a camera, a camcorder, and/or a webcam. The user input device 1420 may receive various types of data input from the user of the system 1000 and may include, for example, a touch pad, a keypad, a keyboard, a mouse, and/or a microphone. The sensor 1430 may detect various types of physical quantities that may be obtained from the outside of the system 1000, and convert the detected physical quantities into electrical signals. The sensor 1430 may include, for example, a temperature sensor, a pressure sensor, an illuminance sensor, a position sensor, an acceleration sensor, a biosensor, and/or a gyroscope sensor. The communication device 1440 may transmit/receive signals to/from other devices outside the system 1000 according to various communication protocols. The communication device 1440 may be implemented including, for example, an antenna, a transceiver, and/or a modem.

The display 1450 and the speaker 1460 may function as output devices that respectively output visual information and aural information to the user of the system 1000. The power supply device 1470 may suitably convert power supplied from a battery (not illustrated) built in the system 1000 and/or an external power supply and supply the power to each of the components of the system 1000. The connection interface 1480 may provide a connection between the system 1000 and an external device that may be connected to the system 1000 to exchange data with the system 1000. The connection interface 1480 may be implemented in various interface methods such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVMe, IEEE 1394, Universal Serial Bus (USB), Secure Digital (SD) card, Multi-Media Card (MMC), eMMC, UFS, embedded Universal Flash Storage (eUFS), and/or Compact Flash (CF) card interface.

Figure 12:
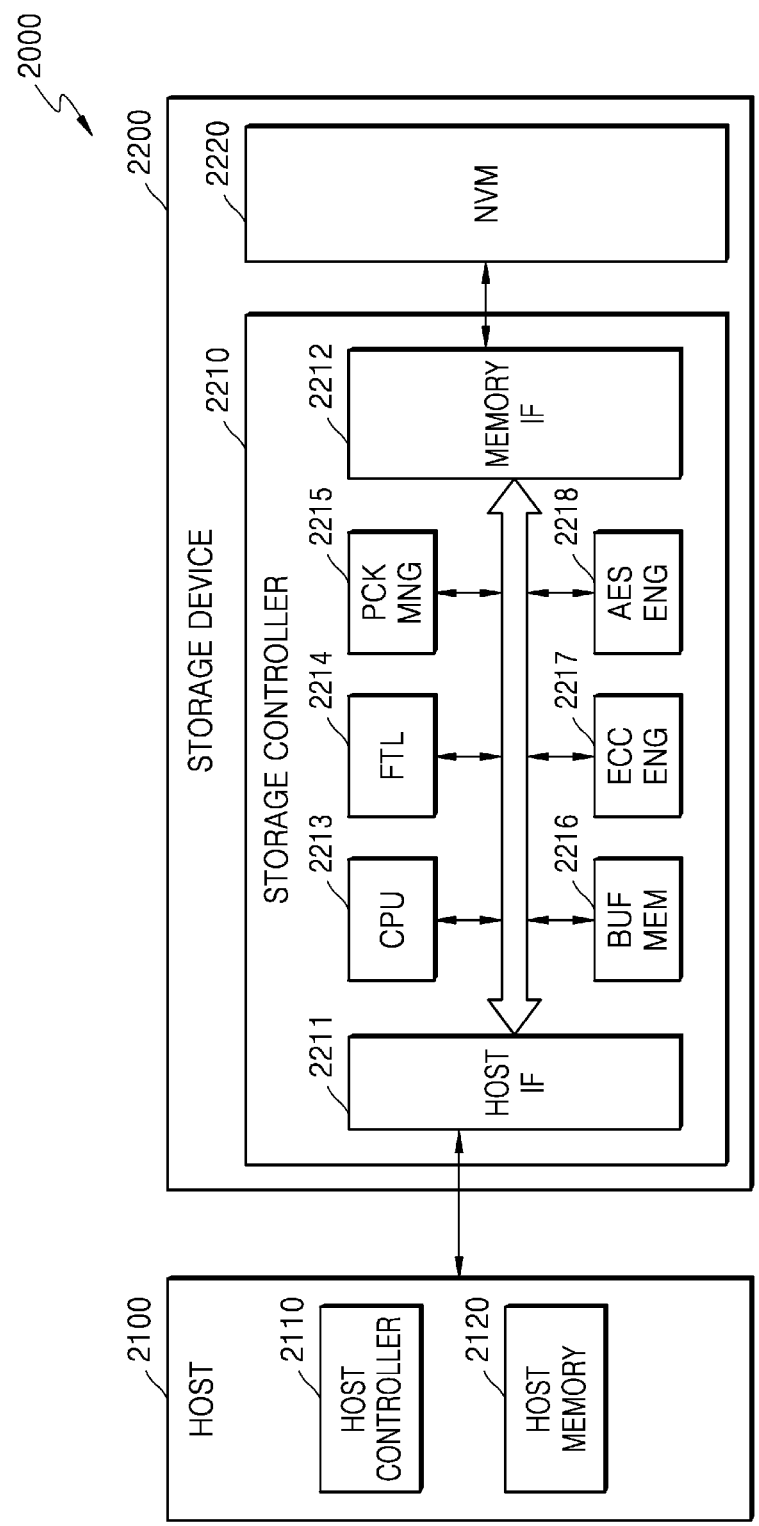
FIG. 12 is a block diagram illustrating a storage system according to another embodiment of the inventive concept.

FIG. 12 is a block diagram illustrating a storage system according to another embodiment of the inventive concept.

Referring to FIG. 12, a host-storage system 2000 may include a host 2100 and a storage device 2200. Also, the storage device 2200 may include a storage controller 2210 and a non-volatile memory (NVM) 2220. Also, according to an embodiment of the inventive concept, the host 2100 may include a host controller 2110 and a host memory 2120. The host memory 2120 may function as a buffer memory for temporarily storing data to be transmitted to the storage device 2200 or data received from the storage device 2200.

The storage device 2200 may include storage mediums for storing data according to the request from the host 2100. As an example, the storage device 2200 may include at least one of a solid state drive (SSD), an embedded memory, and a removable external memory. When the storage device 2200 is an SSD, the storage device 2200 may be a device conforming to the NVMe standard. When the storage device 2200 is an embedded memory or an external memory, the storage device 2200 may be a device conforming to the UFS or eMMC standard. The host 2100 and the storage device 2200 may each generate a packet according to an adopted standard protocol and transmit the same. The host 2100 and storage device 2200 may operate, and may include the various components, as described previously in connection with FIGS. 1-10.

When the non-volatile memory 2220 of the storage device 2200 includes a flash memory, the flash memory may include a 2D NAND memory array or a 3D (or vertical) NAND (VNAND) memory array. As another example, the storage device 2200 may include various other types of non-volatile memories. For example, the storage device 2200 may include magnetic RAMs (MRAMs), spin-transfer torque MRAMs, conductive bridging RAMs (CBRAMs), ferroelectric RAMs (FeRAMs), phase-change RAMs (PRAM), resistive memories (resistive RAMs), and various other types of memories.

According to an embodiment, the host controller 2110 and the host memory 2120 may be implemented as separate semiconductor chips. Alternatively, in some embodiments, the host controller 2110 and the host memory 2120 may be integrated in the same semiconductor chip. As an example, the host controller 2110 may be any one of a plurality of modules provided in an application processor, and the application processor may be implemented as a system-on-chip (SoC). Also, the host memory 2120 may be an embedded memory provided in the application processor or may be a non-volatile memory or a memory module arranged outside an application processor.

The host controller 2110 may manage an operation of storing data (e.g., write data) of a buffer area of the host memory 2120 in the non-volatile memory 2220 or storing data (e.g., read data) of the non-volatile memory 2220 in the buffer area.

The storage controller 2210 may include a host interface 2211, a memory interface 2212, and a central processing unit (CPU) 2213. Also, the storage controller 2210 may further include a flash translation layer (FTL) 2214, a packet manager 2215, a buffer memory 2216, an error correction code (ECC) engine 2217, and an advanced encryption standard (AES) engine 2218. The storage controller 2210 may further include a working memory (not illustrated) into which the FTL 2214 is loaded, and the CPU 2213 may execute a flash conversion layer to control a write operation and a read operation on the non-volatile memory 2220.

The host interface 2211 may transmit/receive a packet to/from the host 2100. The packet transmitted from the host 2100 to the host interface 2211 may include, for example, a command or data to be stored in the non-volatile memory 2220, and the packet transmitted from the host interface 2211 to the host 2100 may include, for example, a response to a command or data read from the non-volatile memory 2220. The memory interface 2212 may transmit data to be stored in the non-volatile memory 2220 to the non-volatile memory 2220 or receive data read from the non-volatile memory 2220. The memory interface 2212 may be implemented to comply with a standard protocol such as Toggle or Open NAND Flash Interface (ONFI).

The FTL 2214 may perform various functions such as address mapping, wear-leveling, and garbage collection. The address mapping may be an operation of changing a logical address received from the host 2100 into a physical address used to actually store data in the non-volatile memory 2220. The wear-leveling may be a technology for preventing excessive degradation of a particular block by allowing the blocks in the non-volatile memory 2220 to be uniformly used and may be implemented through, for example, a firmware technology for balancing erase counts of physical blocks. The garbage collection may be a technology for securing an available capacity in the non-volatile memory 2220 by copying valid data of a block into a new block and then erasing an existing block.

The packet manager 2215 may generate a packet according to the protocol of an interface negotiated with the host 2100 or parse various information from the packet received from the host 2100. Also, the buffer memory 2216 may temporarily store data to be stored in the non-volatile memory 2220 or data to be read from the non-volatile memory 2220. The buffer memory 2216 may be provided in the storage controller 2210 or may be arranged outside the storage controller 2210.

The ECC engine 2217 may perform an error detection and correction function on read data read from the non-volatile memory 2220. More particularly, the ECC engine 2217 may generate parity bits for write data to be stored in the non-volatile memory 2220, and the generated parity bits may be stored in the non-volatile memory 2220 together with the write data. When reading data from the non-volatile memory 2220, the ECC engine 2217 may correct an error in the read data by using the parity bits read from the non-volatile memory 2220 together with the read data and output the error-corrected read data.

The AES engine 2218 may perform at least one of an encryption operation and a decryption operation on the data input into the storage controller 2210 by using a symmetric-key algorithm.

Figure 13:
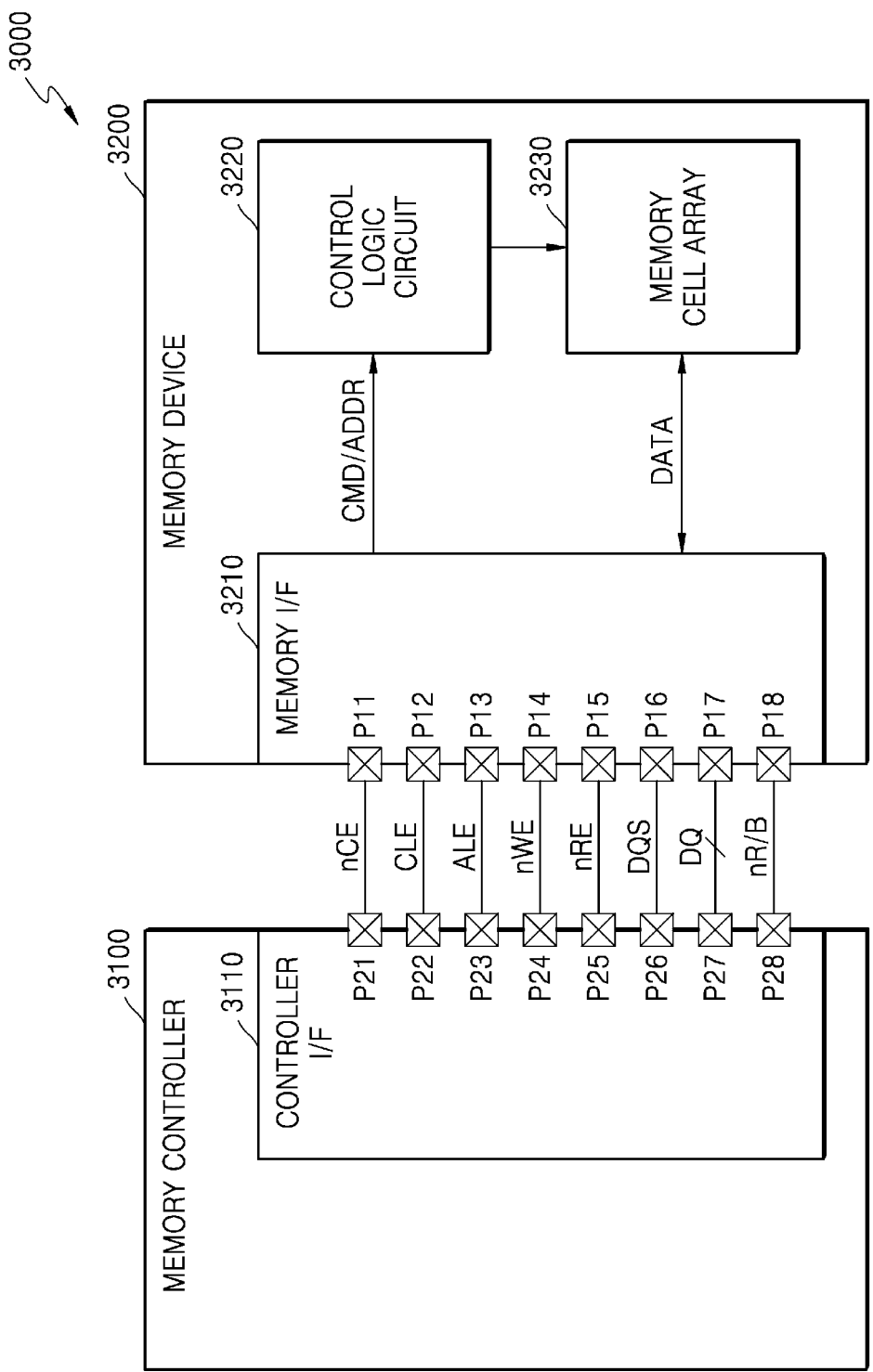
FIG. 13 is a block diagram illustrating a memory system according to an embodiment of the inventive concept.

FIG. 13 is a block diagram illustrating a memory system according to an embodiment of the inventive concept.

Referring to FIG. 13, a memory system 3000 may include a memory device 3200 and a memory controller 3100. The memory device 3200 may correspond to one of non-volatile memory devices that communicate with the memory controller 3100 based on one of a plurality of channels. The memory controller 3100 and memory device 3200 may operate, and may include the various components described previously in connection with FIGS. 1-10.

The memory device 3200 may include first to eighth pins P11 to P18, a memory interface circuit 3210, a control logic circuit 3220, and a memory cell array 3230. The memory interface circuit 3210 may receive a chip enable signal nCE from the memory controller 3100 through the first pin P11. The memory interface circuit 3210 may transmit/receive signals to/from the memory controller 3100 through the second to eighth pins P12 to P18 according to the chip enable signal nCE. For example, when the chip enable signal nCE is in an enable state (e.g., at a low level), the memory interface circuit 3310 may transmit/receive signals to/from the memory controller 3100 through the second to eighth pins P12 to P18.

The memory interface circuit 3210 may receive a command latch enable signal CLE, an address latch enable signal ALE, and a write enable signal nWE from the memory controller 3100 through the second to fourth pins P12 to P14. Through the seventh pin P17, the memory interface circuit 3210 may receive a data signal DQ from the memory controller 3100 or transmit a data signal DQ to the memory controller 3100. A command CMD, an address ADDR, and data DATA may be transmitted through the data signal DQ. For example, the data signal DQ may be transmitted through a plurality of data signal lines. In this case, the seventh pin P17 may include a plurality of pins corresponding to a plurality of data signals.

The memory interface circuit 3210 may obtain the command CMD from the data signal DQ received in an enable period (e.g., a high-level state) of the command latch enable signal CLE based on the toggle timings of the write enable signal nWE. The memory interface circuit 3210 may obtain the address ADDR from the data signal DQ received in an enable period (e.g., a high-level state) of the address latch enable signal ALE based on the toggle timings of the write enable signal nWE.

In an embodiment, the write enable signal nWE may toggle between a high level and a low level while maintaining a static state (e.g., a high level or a low level). For example, the write enable signal nWE may toggle in a period in which the command CMD or the address ADDR is transmitted. Accordingly, the memory interface circuit 3210 may obtain the command CMD or the address ADDR based on the toggle timings of the write enable signal nWE.

The memory interface circuit 3210 may receive a read enable signal nRE from the memory controller 3100 through the fifth pin P15. Through the sixth pin P16, the memory interface circuit 3210 may receive a data strobe signal DQS from the memory controller 3100 or transmit a data strobe signal DQS to the memory controller 3100.

In a data (DATA) output operation of the memory device 3200, the memory interface circuit 3210 may receive a toggling read enable signal nRE through the fifth pin P15 before outputting the data DATA. The memory interface circuit 3210 may generate a toggling data strobe signal DQS based on the toggling of the read enable signal nRE. For example, the memory interface circuit 3210 may generate a data strobe signal DQS that starts toggling after a predetermined delay (e.g., tDQSRE) with respect to a toggling start time of the read enable signal nRE. The memory interface circuit 310 may transmit the data signal DQ including the data DATA based on the toggle timing of the data strobe signal DQS. Accordingly, the data DATA may be transmitted to the memory controller 3100 in alignment with the toggle timing of the data strobe signal DQS.

In a data (DATA) input operation of the memory device 3200, when the data signal DQ including the data DATA is received from the memory controller 3100, the memory interface circuit 3210 may receive a toggling data strobe signal DQS from the memory controller 3100 together with the data DATA. The memory interface circuit 3210 may obtain the data DATA from the data signal DQ based on the toggle timing of the data strobe signal DQS. For example, the memory interface circuit 3210 may obtain the data DATA by sampling the data signal DQ at rising edges and falling edges of the data strobe signal DQS.

The memory interface circuit 3210 may transmit a ready/busy output signal nR/B to the memory controller 3100 through the eighth pin P18. The memory interface circuit 3210 may transmit state information of the memory device 3200 to the memory controller 3100 through the ready/busy output signal nR/B. When the memory device 3200 is in a busy state (i.e., when internal operations of the memory device 3200 are being performed), the memory interface circuit 3210 may transmit the ready/busy output signal nR/B representing the busy state to the memory controller 3100. When the memory device 3200 is in a ready state (i.e., when internal operations of the memory device 3200 are not performed or are completed), the memory interface circuit 3210 may transmit the ready/busy output signal nR/B representing the ready state to the memory controller 3100. For example, while the memory device 3200 reads the data DATA from the memory cell array 3230 in response to a page read command, the memory interface circuit 3210 may transmit the ready/busy output signal nR/B representing the busy state (e.g., a low level) to the memory controller 3100. For example, while the memory device 3200 reads the data DATA from the memory cell array 3230 in response to a program command, the memory interface circuit 3210 may transmit the ready/busy output signal nR/B representing the busy state to the memory controller 3100.

The control logic circuit 3220 may generally control various operations of the memory device 3200. The control logic circuit 3220 may receive the command/address CMD/ADDR obtained from the memory interface circuit 3210. The control logic circuit 3220 may generate control signals for controlling other components of the memory device 3200 according to the received command/address CMD/ADDR. For example, the control logic circuit 3220 may generate various control signals for programming data DATA in the memory cell array 3230 or reading data DATA from the memory cell array 3230.

The memory cell array 3230 may store the data DATA obtained from the memory interface circuit 3210 under the control by the control logic circuit 3220. The memory cell array 3230 may output the stored data DATA to the memory interface circuit 3210 under the control by the control logic circuit 3220.

The memory cell array 3230 may include a plurality of memory cells. For example, the plurality of memory cells may be flash memory cells. However, the inventive concept is not limited thereto, and the memory cells include resistive random access memory (RRAM) cells, ferroelectric random access memory (FRAM) cells, phase-change random access memory (PRAM) cells, thyristor random access memory (TRAM) cells, and/or magnetic random access memory (MRAM) cells. Hereinafter, embodiments of the inventive concept will be described focusing on an embodiment in which the memory cells include NAND flash memory cells.

The memory controller 3100 may include first to eighth pins P21 to P28 and a controller interface circuit 3110. The first to eighth pins P21 to P28 may correspond to the first to eighth pins P11 to P18 of the memory device 3200. The controller interface circuit 3110 may transmit the chip enable signal nCE to the memory device 3200 through the first pin P21. Through the second to eighth pins P22 to P28, the controller interface circuit 3110 may transmit/receive signals to/from the memory device 3200 selected through the chip enable signal nCE.

The controller interface circuit 3110 may transmit the command latch enable signal CLE, the address latch enable signal ALE, and the write enable signal nWE to the memory device 3200 through the second to fourth pins P22 to P24. Through the seventh pin P27, the controller interface circuit 3110 may transmit the data signal DQ to the memory device 3200 or receive the data signal DQ from the memory device 3200.

The controller interface circuit 3110 may transmit the data signal DQ including the command CMD or the address ADDR to the memory device 3200 together with a toggling write enable signal nWE. The controller interface circuit 3110 may transmit the data signal DQ including the command CMD to the memory device 3200 according to the transmission of the command latch enable signal CLE having an enable state and may transmit the data signal DQ including the address ADDR to the memory device 3200 according to the transmission of the address latch enable signal ALE having an enable state.

The controller interface circuit 3110 may transmit the read enable signal nRE to the memory device 3200 through the fifth pin P25. Through the sixth pin P26, the controller interface circuit 3110 may receive the data strobe signal DQS from the memory device 3200 or transmit the data strobe signal DQS to the memory device 3200.

In a data (DATA) output operation of the memory device 3200, the controller interface circuit 3110 may generate a toggling read enable signal nRE and transmit the read enable signal nRE to the memory device 3200. For example, the controller interface circuit 3110 may generate a read enable signal nRE changed from a fixed state (e.g., a high level or a low level) into a toggle state before the data DATA is output. Accordingly, a toggling data strobe signal DQS may be generated in the memory device 3200 based on the read enable signal nRE. The controller interface circuit 3110 may receive the data signal DQ including the data DATA from the memory device 3200 together with the toggling data strobe signal DQS. The controller interface circuit 3110 may obtain the data DATA from the data signal DQ based on the toggle timing of the data strobe signal DQS.

In a data (DATA) input operation of the memory device 3200, the controller interface circuit 3110 may generate a toggling data strobe signal DQS. For example, the controller interface circuit 3110 may generate a data strobe signal DQS changed from a fixed state (e.g., a high level or a low level) into a toggle state before the data DATA is transmitted. The controller interface circuit 3110 may transmit the data signal DQ including the data DATA to the memory device 3200 based on the toggle timings of the data strobe signal DQS. The controller interface circuit 3110 may receive the ready/busy output signal nR/B from the memory device 3200 through the eighth pin P28. The controller interface circuit 3110 may determine the state information of the memory device 3200 based on the ready/busy output signal nR/B.

Figure 14:
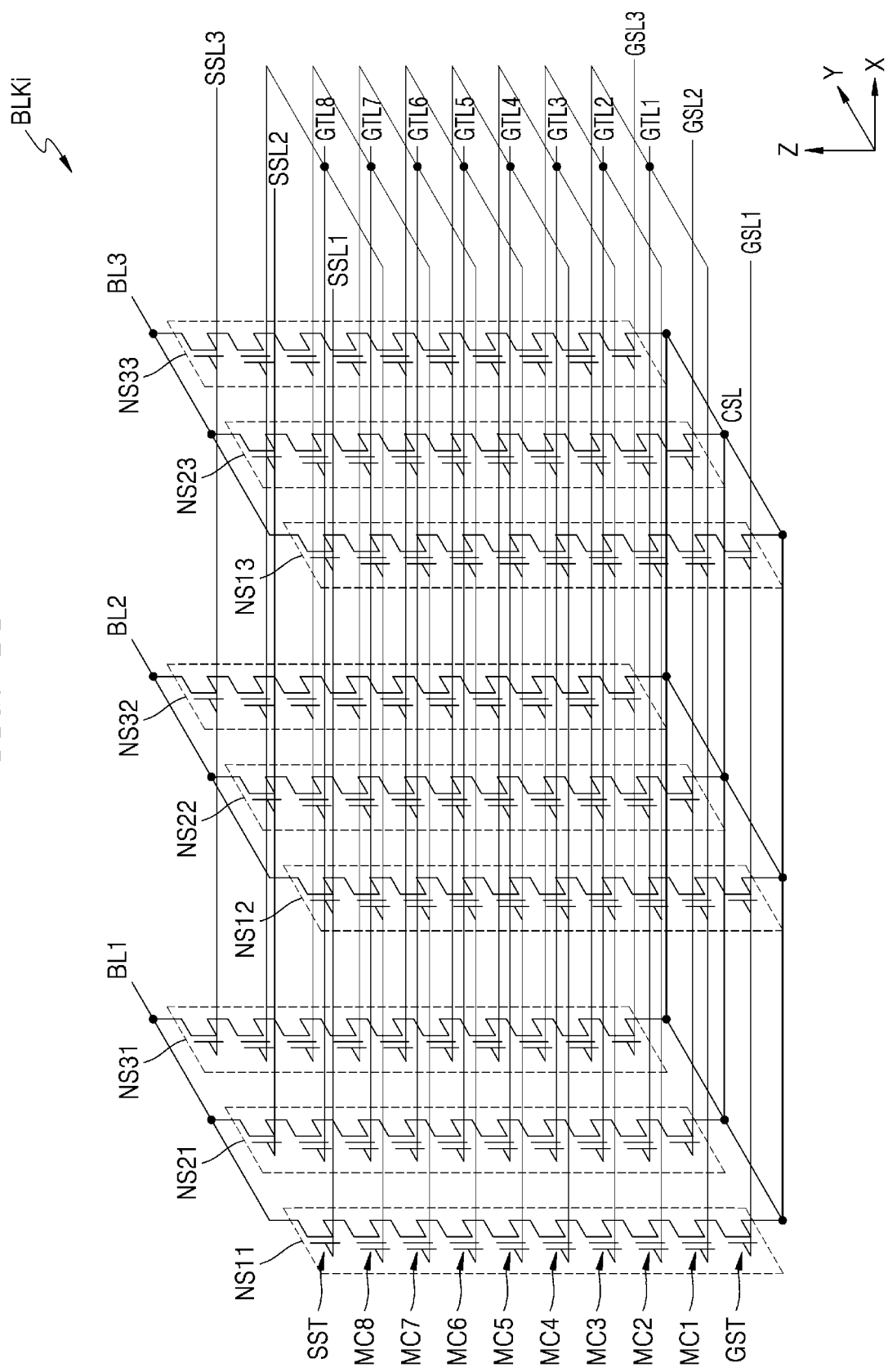
FIG. 14 is a diagram for describing a 3D VNAND structure according to an embodiment of the inventive concept.

FIG. 14 is a diagram for describing a 3D VNAND structure according to an embodiment of the inventive concept.

Referring to FIG. 14, when a non-volatile memory is implemented as a 3D vertical NAND (VNAND) type flash memory, each of a plurality of memory blocks constituting a storage module may be represented as an equivalent circuit illustrated in FIG. 14. A memory block BLKi may represent a 3D memory block formed in a 3D structure on a substrate. For example, a plurality of memory NAND strings included in the memory block BLKi may be formed in a direction perpendicular to the substrate.

The memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1, MC2, . . . , MC8, and a ground selection transistor GST. Although FIG. 14 illustrates that each of the plurality of memory NAND strings NS11 to NS33 includes eight memory cells MC1, MC2, . . . , MC8, the inventive concept is not necessarily limited thereto.

The string selection transistor SST may be connected to corresponding string selection lines SSL1, SSL2, and SSL3. The plurality of memory cells MC1, MC2, . . . , MC8 may be respectively connected to corresponding gate lines GTL1, GTL2, GTL8. The gate lines GTL1, GTL2, GTL8 may correspond to word lines, and some of the gate lines GTL1, GTL2, GTL8 may correspond to dummy word lines. The ground selection transistor GST may be connected to corresponding ground selection lines GSL1, GSL2, and GSL3. The string selection transistor SST may be connected to the corresponding bit lines BL1, BL2, and BL3, and the ground selection transistor GST may be connected to the common source line CSL.

Word lines (e.g., WL1) of the same height may be connected in common, and the ground selection lines GSL1, GSL2, and GSL3 and the string selection lines SSL1, SSL2, and SSL3 may be separated from each other. Although FIG. 14 illustrates that the memory block BLKi is connected to eight gate lines GTL1, GTL2, GTL8 and three bit lines BL1, BL2, and BL3, the inventive concept is not necessarily limited thereto. The non-volatile memory of FIG. 14 may be used as the non-volatile memory 130 of FIG. 1, the flash memory 1320a and/or 1320b of FIG. 11, the NVM 2220 of FIG. 12, or the memory cell array 3230 of FIG. 13.

Figure 15:
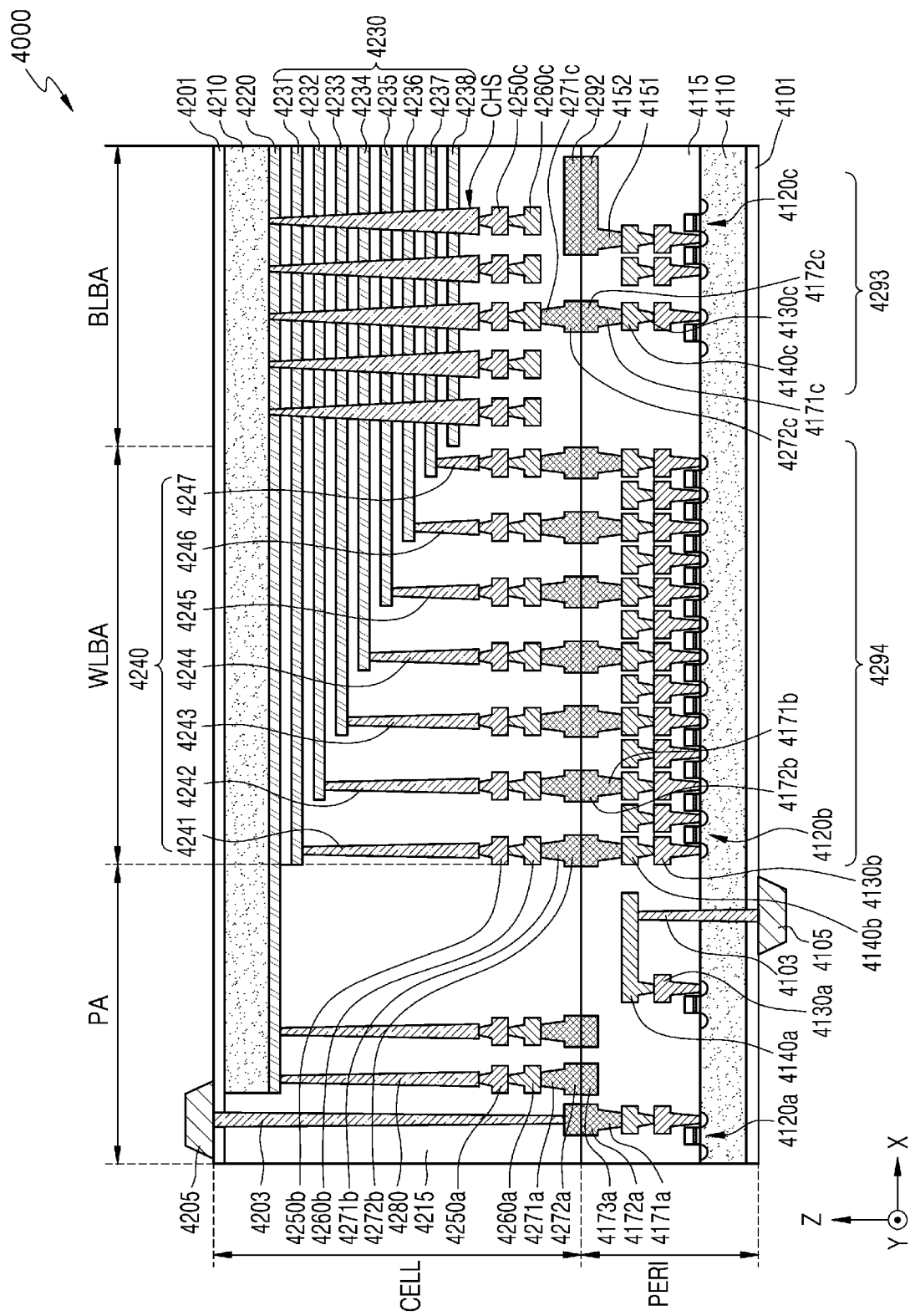
FIG. 15 is a diagram for describing a BVNAND structure according to an embodiment of the inventive concept.

FIG. 15 is a diagram for describing a BVNAND structure according to an embodiment of the inventive concept.

Referring to FIG. 15, when a non-volatile memory is implemented as a bonding vertical NAND (BVNAND) type flash memory, the non-volatile memory may have a structure illustrated in FIG. 15. The non-volatile memory of FIG. 15 may be used as the non-volatile memory 130 of FIG. 1, the flash memory 1320*a* and/or 1320*b* of FIG. 11, the NVM 2220 of FIG. 12, or the memory cell array 3230 of FIG. 13, and may be used to implement the non-volatile memory of FIG. 14.

A memory device 4000 may have a chip-to-chip (C2C) structure. As for the C2C structure, an upper chip including a cell area CELL may be fabricated over a first wafer, a lower chip including a peripheral circuit area PERI may be fabricated over a second wafer different from the first wafer, and then the upper chip and the lower chip may be connected to each other by a bonding method. For example, the bonding method may refer to a method of electrically connecting a bonding metal formed in the uppermost metal layer of the upper chip to a bonding metal formed in the uppermost metal layer of the lower chip. For example, when the bonding metal is formed of copper (Cu), the bonding method may be a Cu—Cu bonding method, and the bonding metal may also be formed of aluminum or tungsten.

Each of the peripheral circuit area PERI and the cell area CELL of the memory device 4000 may include an external pad bonding area PA, a word line bonding area WLBA, and a bit line bonding area BLBA.

The peripheral circuit area PERI may include a first substrate 4110, an interlayer insulating layer 4115, a plurality of circuit elements 4120*a*, 4120*b*, and 4120*c* formed over the first substrate 4110, first metal layers 4130*a*, 4130*b*, and 4130*c* respectively connected to the plurality of circuit elements 4120*a*, 4120*b*, and 4120*c*, and second metal layers 4140*a*, 4140*b*, and 4140*c* formed over the first metal layers 4130*a*, 4130*b*, and 4130*c*. In an embodiment, the first metal layers 4130*a*, 4130*b*, and 4130*c* may be formed of tungsten having a relatively high resistance, and the second metal layers 4140*a*, 4140*b*, and 4140*c* may be formed of copper having a relatively low resistance.

Herein, only the first metal layers 4130*a*, 4130*b*, and 4130*c* and the second metal layers 4140*a*, 4140*b*, and 4140*c* are illustrated and described; however, the inventive concept is not limited thereto and at least one or more metal layers may be further formed over the second metal layers 4140*a*, 4140*b*, and 4140*c*. At least some of the one or more metal layers formed over the second metal layers 4140*a*, 4140*b*, and 4140*c* may be formed of aluminum or the like having a lower resistance than copper forming the second metal layers 4140*a*, 4140*b*, and 4140*c*.

The interlayer insulating layer 4115 may be arranged over the first substrate 4110 to cover the plurality of circuit elements 4120*a*, 4120*b*, and 4120*c*, the first metal layers 4130*a*, 4130*b*, and 4130*c*, and the second metal layers 4140*a*, 4140*b*, and 4140*c* and may include an insulating material such as silicon oxide or silicon nitride.

Lower bonding metals 4171*b* and 4172*b* may be formed over the second metal layer 4140*b* of the word line bonding area WLBA. In the word line bonding area WLBA, the lower bonding metals 4171*b* and 4172*b* of the peripheral circuit area PERI may be electrically connected to upper bonding metals 4271*b* and 4272*b* of the cell area CELL by a bonding method, and the lower bonding metals 4171*b* and 4172*b* and the upper bonding metals 4271*b* and 4272*b* may be formed of aluminum, copper, tungsten, or the like.

The cell area CELL may provide at least one memory block. The cell area CELL may include a second substrate 4210 and a common source line 4220. Over the second substrate 4210, a plurality of word lines 4230 (4231 to 4238) may be stacked in a direction (Z-axis direction) perpendicular to the top surface of the second substrate 4210. String selection lines and a ground selection line may be respectively arranged over and under the word lines 4230, and the plurality of word lines 4230 may be arranged between the string selection lines and the ground selection lines.

In the bit line bonding area BLBA, a channel structure CHS may extend in a direction perpendicular to the top surface of the second substrate 4210 to pass through the word lines 4230, the string selection lines, and the ground selection line. The channel structure CHS may include a data storage layer, a channel layer, and a buried insulating layer, and the channel layer may be electrically connected to a first metal layer 4250*c* and a second metal layer 4260*c*. For example, the first metal layer 4250*c* may be a bit line contact, and the second metal layer 4260*c* may be a bit line. In an embodiment, the bit line 4260*c* may extend in a first direction (Y-axis direction) parallel to the top surface of the second substrate 4210.

An area in which the channel structure CHS and the bit line 4260*c* are arranged may be defined as the bit line bonding area BLBA. The bit line 4260*c* may be electrically connected to the circuit elements 4120*c* providing a page buffer 4293 in the peripheral circuit area PERI in the bit line bonding area BLBA. For example, the bit line 4260*c* may be connected to upper bonding metals 4271*c* and 4272*c* in the peripheral circuit area PERI, and the upper bonding metals 4271*c* and 4272*c* may be connected to lower bonding metals 4171*c* and 4172*c* connected to the circuit elements 4120*c* of the page buffer 4293.

In the word line bonding area WLBA, the word lines 4230 may extend in a second direction (X-axis direction) parallel to the top surface of the second substrate 4210 and may be connected to a plurality of cell contact plugs 4240 (4241 to 4247). The word lines 4230 and the cell contact plugs 4240 may be connected to each other at pads provided by at least some of the word lines 4230 extending in different lengths in the second direction. A first metal layer 4250*b* and a second metal layer 4260*b* may be sequentially connected to the upper portions of the cell contact plugs 4240 connected to the word lines 4230. The cell contact plugs 4240 may be connected to the peripheral circuit area PERI through the upper bonding metals 4271*b* and 4272*b* of the cell area CELL and the lower bonding metals 4171*b* and 4172*b* of the peripheral circuit area PERI in the word line bonding area WLBA.

The cell contact plugs 4240 may be electrically connected to the circuit elements 4120*b* providing a row decoder 4294 in the peripheral circuit area PERI. In an embodiment, the operation voltage of the circuit elements 4120*b* providing the row decoder 4294 may be different from the operation voltage of the circuit elements 4120*c* providing the page buffer 4293. For example, the operation voltage of the circuit elements 4120*c* providing the page buffer 4293 may be greater than the operation voltage of the circuit elements 4120*b* providing the row decoder 4294.

A common source line contact plug 4280 may be arranged in the external pad bonding area PA. The common source line contact plug 4280 may be formed of a conductive material such as a metal, a metal compound, or polysilicon and may be electrically connected to the common source line 4220. A first metal layer 4250*a* and a second metal layer 4260*a* may be sequentially stacked over the common source line contact plug 4280. For example, an area in which the common source line contact plug 4280, the first metal layer 4250*a*, and the second metal layer 4260*a* are arranged may be defined as the external pad bonding area PA.

Moreover, input/output pads 4105 and 4205 may be arranged in the external pad bonding area PA. A lower insulating layer 4101 covering the bottom surface of the first substrate 4110 may be formed under the first substrate 4110, and a first input/output pad 4105 may be formed over the lower insulating layer 4101. The first input/output pad 4105 may be connected through the first input/output contact plug 4103 to at least one of the plurality of circuit elements 4120$a$, 4120$b$, and 4120$c$ arranged in the peripheral circuit area PERI and may be separated from the first substrate 4110 by the lower insulating layer 4101. Also, a side insulating layer may be arranged between the first input/output contact plug 4103 and the first substrate 4110 to electrically separate the first input/output contact plug 4103 from the first substrate 4110.

An upper insulating layer 4201 covering the top surface of the second substrate 4210 may be formed over the second substrate 4210, and a second input/output pads 4205 may be arranged over the upper insulating layer 4201. The second input/output pad 4205 may be connected through the second input/output contact plug 4203 to at least one of the plurality of circuit elements 4120$a$, 4120$b$, and 4120$c$ arranged in the peripheral circuit area PERI.

In some embodiments, the second substrate 4210 and the common source line 4220 may not be arranged in an area where the second input/output contact plug 4203 is arranged. Also, the second input/output pad 4205 may not overlap the word lines 4230 in a third direction (Z-axis direction). The second input/output contact plug 4203 may be separated from the second substrate 4210 in a direction parallel to the top surface of the second substrate 4210 and may be connected to the second input/output pad 4205 through an interlayer insulating layer 4215 of the cell area CELL.

In some embodiments, the first input/output pad 4105 and the second input/output pad 4205 may be selectively formed. For example, the memory device 4000 may include only the first input/output pad 4105 arranged over the first substrate 4110 or may include only the second input/output pad 4205 arranged over the second substrate 4210. Alternatively, the memory device 4000 may include both the first input/output pad 4105 and the second input/output pad 4205.

In each of the external pad bonding area PA and the bit line bonding area BLBA respectively included in the cell area CELL and the peripheral circuit area PERI, a metal pattern of the uppermost metal layer may exist as a dummy pattern or the uppermost metal layer may be empty.

In the external pad bonding area PA of the memory device 4000, corresponding to an upper metal pattern 4272$a$ formed in the uppermost metal layer of the cell area CELL, a lower metal pattern 4176$a$ having the same shape as the upper metal pattern 4272$a$ may be formed in the uppermost metal layer of the peripheral circuit area PERI. The lower metal pattern 4176$a$ formed in the uppermost metal layer of the peripheral circuit area PERI may not be connected to a separate contact in the peripheral circuit area PERI. Similarly, in the external pad bonding area PA, corresponding to the lower metal pattern formed in the uppermost metal layer of the peripheral circuit area PERI, an upper metal pattern having the same shape as the lower metal pattern of the peripheral circuit area PERI may be formed in the upper metal layer of the cell area CELL.

The lower bonding metals 4171$b$ and 4172$b$ may be formed over the second metal layer 4140$b$ of the word line bonding area WLBA. In the word line bonding area WLBA, the lower bonding metals 4171$b$ and 4172$b$ of the peripheral circuit area PERI may be electrically connected to the upper bonding metals 4271$b$ and 4272$b$ of the cell area CELL by a bonding method.

Also, in the bit line bonding area BLBA, corresponding to a lower metal pattern 4152 formed in the uppermost metal layer of the peripheral circuit area PERI, an upper metal pattern 4292 having the same shape as the lower metal pattern 4152 of the peripheral circuit area PERI may be formed in the uppermost metal layer of the cell area CELL. A contact may not be formed over the upper metal pattern 4292 formed in the uppermost metal layer of the cell area CELL.

While the inventive concept has been particularly shown and described with reference to embodiments thereof, it will be understood that various changes in form and details may be made therein without departing from the spirit and scope of the following claims.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

What is claimed is:

1. A storage device including a plurality of components comprising:
   a storage controller configured to receive a get log page command from a host and transmit, to the host, log data about at least one context, but not all contexts, selected from among respective contexts of the plurality of components according to the get log page command; and
   a memory configured to store the log data,
   wherein the get log page command includes a data pointer, a first command double word, and a second command double word, and
   wherein the first command double word includes bit information corresponding to a telemetry host-initiated indicator and the second command double word includes selection information for selecting at least one component from among the plurality of components.

2. The storage device of claim 1, wherein the storage controller includes:
   a context selecting module configured to select the at least one context based on the selection information and generate context information about the selected context;
   a log generating module configured to generate the log data based on the context information and control the memory to store the log data; and a transmitting module configured to transmit the log data to the host.

3. The storage device of claim 2, further comprising a data format changing module configured to process the log data to convert the log data into data in a human-readable format and output the processed log data,
wherein the transmitting module is further configured to transmit the processed log data to the host.

4. The storage device of claim 3, wherein the data format changing module is further configured to control the memory to load the log data stored in the memory and change the loaded log data into the data in the human-readable format.

5. The storage device of claim 1, wherein the memory includes a volatile memory or a non-volatile memory.

6. A storage device including a plurality of components, the storage device comprising:
a memory; and
a storage controller configured to:
detect an error event indicating that an error has occurred in at least one component among the plurality of components, generate log data about at least one context of a plurality of contexts of the at least one component in response to the error event, and control the memory to store the log data, the log data consisting of the at least one context, but not all of the plurality of contexts,
transmit an asynchronous event request signal to a host,
receive a get log page command from the host, wherein the get log page command includes a data pointer, a first command double word, and a second command double word, the first command double word including bit information corresponding to a telemetry controller-initiated indicator and the second command double word including selection information for selecting at least one component from among the plurality of components.

7. The storage device of claim 6, wherein the storage controller is further configured to:
process the log data to convert the log data into data in a human-readable format in response to the get log page command, and
transmit the processed log data to the host.

8. The storage device of claim 7, wherein the storage controller includes:
a context selecting module configured to generate context information about the at least one context in response to the error event;
a log generating module configured to generate the log data based on the context information and to control the memory to store the log data; and
a transmitting module configured to transmit the asynchronous event request signal to the host.

9. The storage device of claim 8, further comprising a data format changing module configured to control the memory to load the log data in response to the get log page command and convert the loaded log data into the data in the human-readable format,
wherein the transmitting module is further configured to transmit the log data converted into the data in the human-readable format to the host.

10. The storage device of claim 6, wherein the memory includes a volatile memory or a non-volatile memory.

11. An operating method of a storage device including a plurality of components, the operating method comprising:
a detecting operation of detecting an error event indicating that an error has occurred in at least one component among the plurality of components;
a generating operation of generating log data about a sub-context of the at least one component in response to the error event;
a storing operation of storing the log data;
a request transmitting operation of transmitting an asynchronous event request signal to a host after the storing operation;
a receiving operation of receiving a get log page command from the host; and
a data transmitting operation of transmitting the log data to the host in response to the get log page command,
wherein the get log page command includes:
selection information for selecting the at least one component, and
a data pointer, a first command double word, and a second command double word,
wherein the first command double word includes bit information corresponding to a telemetry controller-initiated indicator, and
wherein the second command double word includes the selection information.

12. The operating method of claim 11, further comprising a processing operation of processing the stored log data to convert the stored log data into data in a human-readable format, after the receiving operation, wherein the data transmitting operation includes transmitting the processed log data to the host.

13. The operating method of claim 12, wherein the human-readable format includes at least one of JavaScript Object Notation (JSON), extensible Markup Language (XML), and Character-Separated Values (CSV).

14. The operating method of claim 11, wherein:
the storage device includes a volatile memory or a non-volatile memory, and
the storing operation includes storing the log data in the volatile memory or the non-volatile memory.

* * * * *